United States Patent
Farajidana et al.

(10) Patent No.: US 10,771,218 B2
(45) Date of Patent: Sep. 8, 2020

(54) METHOD AND APPARATUS FOR USING CHANNEL STATE INFORMATION REFERENCE SIGNAL IN WIRELESS COMMUNICATION SYSTEM

(71) Applicant: QUALCOMM Incorporated, San Diego, CA (US)

(72) Inventors: Amir Farajidana, Sunnyvale, CA (US); Alexei Yurievitch Gorokhov, San Diego, CA (US); Juan Montojo, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/427,108

(22) Filed: May 30, 2019

(65) Prior Publication Data
US 2019/0280839 A1 Sep. 12, 2019

Related U.S. Application Data

(63) Continuation of application No. 12/899,448, filed on Oct. 6, 2010, now abandoned.
(Continued)

(51) Int. Cl.
*H04L 5/00* (2006.01)
*H04L 25/02* (2006.01)
*H04B 7/0417* (2017.01)

(52) U.S. Cl.
CPC ............ *H04L 5/0048* (2013.01); *H04L 5/005* (2013.01); *H04L 5/0023* (2013.01);
(Continued)

(58) Field of Classification Search
CPC ..... H04L 5/0048; H04L 5/0035; H04L 5/005; H04L 5/0051; H04L 5/0023;
(Continued)

(56) References Cited

U.S. PATENT DOCUMENTS 7,573,854 B2   8/2009   Heo et al.
8,000,284 B2   8/2011   Lott et al.
(Continued)

FOREIGN PATENT DOCUMENTS

CN   1270552 A     10/2000
CN   101478365 A    7/2009
(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 8), 3GPP TS 36.211 V8.9.0, Dec. 2009, pp. 1-83.
(Continued)

*Primary Examiner* — George Eng
*Assistant Examiner* — Hung K Du
(74) *Attorney, Agent, or Firm* — Qualcomm Incorporated/Seyfarth Shaw LLP

(57) ABSTRACT

A method for wireless communication is disclosed which includes selecting a first resource pattern comprising resource elements that are non-colocated with a second resource pattern and allocating the first resource pattern to a plurality of antennas for transmitting a channel state information reference signal.

20 Claims, 13 Drawing Sheets

Related U.S. Application Data

(60) Provisional application No. 61/257,187, filed on Nov. 2, 2009, provisional application No. 61/249,906, filed on Oct. 8, 2009.

(52) U.S. Cl.
CPC .......... *H04L 5/0035* (2013.01); *H04L 5/0051* (2013.01); *H04L 5/0053* (2013.01); *H04L 5/0073* (2013.01)

(58) Field of Classification Search
CPC . H04L 5/0053; H04L 5/0073; H04L 25/0224; H04B 7/0417
See application file for complete search history.

(56) References Cited

U.S. PATENT DOCUMENTS

| | | | |
|---|---|---|---|
| 8,310,994 | B2 | 11/2012 | Kwon et al. |
| 8,559,879 | B2 | 10/2013 | Bhushan et al. |
| 8,913,581 | B2 | 12/2014 | Noh et al. |
| 10,193,678 | B2 | 1/2019 | Bhattad et al. |
| 2006/0153312 | A1 | 7/2006 | Yun et al. |
| 2008/0225784 | A1 | 9/2008 | Tseng |
| 2009/0202014 | A1 | 8/2009 | Mujtaba et al. |
| 2009/0225721 | A1 | 9/2009 | Cudak et al. |
| 2009/0296563 | A1 | 12/2009 | Kishiyama et al. |
| 2010/0008018 | A1 | 1/2010 | Korich et al. |
| 2010/0034299 | A1 | 2/2010 | Love et al. |
| 2010/0075691 | A1 | 3/2010 | Cai et al. |
| 2010/0080187 | A1 | 4/2010 | Papasakellariou et al. |
| 2010/0238821 | A1 | 9/2010 | Liu et al. |
| 2010/0265901 | A1 | 10/2010 | Koo et al. |
| 2011/0176499 | A1 | 7/2011 | Siomina et al. |
| 2011/0200126 | A1 | 8/2011 | Bontu et al. |
| 2011/0237270 | A1* | 9/2011 | Noh ...................... H04B 7/0413 455/450 |
| 2011/0244877 | A1 | 10/2011 | Farajidana et al. |
| 2011/0252139 | A1 | 10/2011 | Bhattad et al. |
| 2011/0274071 | A1 | 11/2011 | Lee et al. |
| 2011/0317641 | A1 | 12/2011 | Noh et al. |
| 2012/0002740 | A1 | 1/2012 | Han et al. |
| 2012/0014779 | A1 | 1/2012 | Gilliam |
| 2012/0015541 | A1 | 1/2012 | Lu |
| 2012/0033643 | A1* | 2/2012 | Noh ...................... H04L 5/0048 370/335 |
| 2012/0039298 | A1 | 2/2012 | Lee et al. |
| 2012/0058791 | A1 | 3/2012 | Bhattad et al. |
| 2012/0082119 | A1 | 4/2012 | Chung et al. |
| 2012/0092989 | A1 | 4/2012 | Baldemair et al. |
| 2012/0106493 | A1 | 5/2012 | Noh et al. |
| 2012/0120842 | A1 | 5/2012 | Kim et al. |
| 2012/0120903 | A1 | 5/2012 | Kim et al. |
| 2012/0120905 | A1 | 5/2012 | Ko et al. |
| 2012/0127945 | A1 | 5/2012 | Ko et al. |
| 2012/0147794 | A1* | 6/2012 | Chung .................. H04L 5/0057 370/280 |
| 2012/0155414 | A1* | 6/2012 | Noh ...................... H04B 7/0417 370/329 |
| 2012/0220327 | A1 | 8/2012 | Lee et al. |
| 2012/0257553 | A1 | 10/2012 | Noh et al. |
| 2012/0264441 | A1 | 10/2012 | Chandrasekhar et al. |
| 2012/0315859 | A1 | 12/2012 | Lee et al. |
| 2013/0039203 | A1 | 2/2013 | Fong et al. |
| 2013/0039388 | A1 | 2/2013 | Xu et al. |

FOREIGN PATENT DOCUMENTS

| | | |
|---|---|---|
| CN | 101483499 A | 7/2009 |
| CN | 101505180 A | 8/2009 |
| CN | 101588631 A | 11/2009 |
| CN | 101636938 A | 1/2010 |
| EP | 2456154 A2 | 5/2012 |
| JP | 2011515047 A | 5/2011 |
| JP | 2012510772 A | 5/2012 |
| KR | 20070089107 A | 8/2007 |
| KR | 20080054164 A | 6/2008 |
| TW | 200526051 A | 8/2005 |
| TW | 200709596 | 3/2007 |
| WO | 05018181 | 2/2005 |
| WO | 2006118434 | 11/2006 |
| WO | 2007083081 A1 | 7/2007 |
| WO | 2008115003 A2 | 9/2008 |
| WO | 2009041770 A2 | 4/2009 |
| WO | 2009096319 A1 | 8/2009 |
| WO | 2009100371 A2 | 8/2009 |
| WO | 2009114376 A1 | 9/2009 |
| WO | 2009120791 A2 | 10/2009 |
| WO | 2009132143 A1 | 10/2009 |
| WO | 2010064842 A2 | 6/2010 |
| WO | 2011044530 | 4/2011 |

OTHER PUBLICATIONS

Alcatel-Lucent, et al., "Proposed Way forward on Rel-9 Dual-layer beamforming for TDD and FDD", 3GPP TSG RAN WG1 meeting #58, R1-093697, CHN, Shenzhen, Aug. 24-28, 2009.

Alcatel-Lucent Shanghai Bell: "Considerations on CSI-RS design", 3GPP TSG-RAN WG1#58b R1-093772, Oct. 6, 2009.

Alcatel-Lucent Shanghai Bell et al: CSI-RS Inter-cell Design Consideration, 3GPP Draft; R1-100924_Final, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418523, [retrieved on Feb. 16, 2010].

Baker M., "LTE-Advanced Physical Layer", IMT-Advanced Evaluation Workshop Dec. 17-18, 2009, Beijing, 9 No. REV-090003r1 Dec. 17, 2009 (Dec. 17, 2009), pp. 1-48.

CATT: "Intra cell and inter cell CSI RS design for LTE-A", 3GPP Draft; R1-100885, 3rd Generation Partnership Project (3GPP), Mobile Competence Centre ; 650, Route Des Lucioles ; F-06921 Sophia-Antipolis Cedex 71, ; France, vol. RAN WGI, No. San Francisco, USA; Feb. 22, 2010, Feb. 16, 2010 (Feb. 16, 2010), 92-107, XP050418489, [retrieved on Feb. 16, 2010].

European Search Report—EP19160548—Search Authority—Munich—dated Jun. 13, 2019.

Fujitsu: "Considerations on CSI RS design in LTE-A", 3GPP Draft, R1-094331, 3rd Generation Partnership Project (3GPP), Mobile Competence Centre, 650, Route Des Lucioles, F-06921 Sophia-Antipolis Cedex, France, No. Miyazaki, Oct. 12, 2009, Oct. 12, 2009 (Oct. 12, 2009), pp. 1-7, XP050388785, [retrieved on Oct. 15, 2009].

Fujitsu: "Considerations on CSI RS design in LTE-A", 3GPP TSG-RAN WG1#58b R1-094249, Oct. 8, 2009.

Fujitsu: "CSI-RS and DRS Design for LTE-A System", 3GPP Draft; R1-091950, 3rd Generation Partnership Project (3GPP), Mobile Competence Centre; 650, Route Des Lucioles; F-06921 Sophia-Antipolis Cedex; France, No. San Francisco, USA; May 2, 2009, May 2, 2009 (May 2, 2009), XP050339424, [retrieved on May 2, 2009] p. 1-p. 2 figures 1, 3, 5-8.

Huawei: "Cell-specific mapping of distributed virtual resource blocks", 3GPP TSG-RAN WG1 Meeting #50, R1-073513, Aug. 20, 2007, pp. 1-8.

Huawei: "Consideration on CSI-RS design for CoMP and text proposal to 36.814", 3GPP Draft; R1-093031 Consideration on CSI-RS Design for CoMP and Text Proposal to 36.814, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, Aug. 18, 2009 (Aug. 18, 2009), XP050351428, [retrieved on Aug. 18, 2009].

Huawei, "Evaluation on muting benefit for CSI RS design", 3GPP TSG-RAN WG1 #61, R1-103102, Montreal, Canada, May 10-14, 2010.

Huawei: "Further results of transmit diversity schemes for common", distributed and broadcast channels, 3GPP TSG-RAN WG1 Meeting #44, R1-060494, Feb. 13, 2006, pp. 1-6.

(56) References Cited

OTHER PUBLICATIONS

Huawei: "Inter-cell CSI-RS Analysis", 3GPP Draft, R1-100248 Inter-Cell CSI RS, 3rd Generation Partnership Project (3GPP), Mobile Competence Centre, 650, Route Des Lucioles, F-06921 Sophia-Antipolis Cedex, France, vol. RAN WGI, No. Valencia, Spain, Jan. 18, 2010, Jan. 14, 2009 (Jan. 14, 2009), XP050418351, [retrieved on Jan. 14, 2009].

Huawei: "Intra-cell CSI RS design and evaluation", 3GPP Draft; R1-100782, 3rd Generation Partnership Project (3GPP), Mobile Competence Centre ; 650, Route Des Lucioles ; F-06921 Sophia-Antipolis Cedex ; France, vol. RAN WGI, No. Valencia, Spain; Jan. 18, 2010, Jan. 21, 2010 (Jan. 21, 2010), XP050418401, [retrieved on Jan. 21, 2010].

Huawei Technologies., "CSI-RS simulation assumptions", 3GPP TSG RAN WG1 meeting #60, R1-101632, Feb. 22-26, 2010, San Francisco, USA, 7 pages.

Intel Corporation (UK) Ltd: "Signalling and power utilization considerations for PDSCH muting", 3GPP Draft; R1-104376, 3rd Generation Partnership Project (3GPP), Mobile Competence Centre ; 650, Route Des Lucioles ; F-06921 Sophia-Antipolis Cedex ; France, vol. RAN WGI, No. Madrid, Spain; Aug. 23, 2010, Aug. 17, 2010 (Aug. 17, 2010), XP050449727, [retrieved on Aug. 17, 2010].

Intel Corporation (UK): "Remaining details of CSI-RS structure", 3GPP Draft; R1-110249, 3rd Generation Partnership Project (3GPP), Mobile Competence Centre ; 650, Route Des Lucioles ; F-06921 Sophia-Antipolis Cedex ; France, vol. RAN WGI, No. Dublin, Ireland; Jan. 17, 2010, Jan. 11, 2011 (Jan. 11, 2011), XP050490153, [retrieved on Jan. 11, 2011].

International Preliminary Report on Patentability—PCT/US2011/031456, The International Bureau of WIPO—Geneva, Switzerland, dated Oct. 18, 2012.

International Search Report and Written Opinion—PCT/US2010/052101, ISA/EPO—dated May 12, 2011.

LG Electronics, et al., "Harmonized Proposal for CSI-RS Pattern", 3GPP TSG RAN WG1 Meeting #61 b, R1-104263, Dresden, Germany, Jun. 28-Jul. 2, 2010.

LG Electronics, "Inter-Cell CSI-RS design and Inter-Cell measurement consideration", 3GPP TSG-RAN WG1 Meeting #60 R1-101550, Feb. 19, 2010.

LG Electronics: "Further Details on CSI-RS Design for LTE-Advanced", 3GPP TSG RAN WG1 Meeting #58bis, R1-094171, Oct. 6, 2009, 5 pages, URL:http://www.3gpp.org/ftp/tsg_ran/WG1_RL1/TSGR1_58b/Docs/R1-094171.zip.

Motorola: "Impact of Supporting Blank Sub frames", 3GPP TSG RAN Plenary Meeting No. 42, Athens, Greece, [Online] vol. RP-081059, Dec. 2, 2008 (Dec. 2, 2008), pp. 1-10, XP002589696, Retrieved from the Internet: URL:http://www.3gpp.org/ftp/tsg-ran/tsg-ran/TSGR42/docs/> [retrieved on Jun. 28, 2010] the whole document.

Nokia et al., "CSI-RS design for LTE-Advanced downlink", 3GPP Draft, R1-091351, 3rd Generation Partnership Project (3GPP), Mobile Competence Centre, 650, Route Des Lucioles, F-06921 Sophia-Antipolis Cedex, France, No. Seoul, Korea, Mar. 18, 2009, Mar. 18, 2009 (Mar. 18, 2009), XP050338944, [retrieved on Mar. 18, 2009].

Nokia, et al., "Further considerations on UE-specific reference symbol multiplexing for LTE-Advanced downlink", 3GPP Draft, R1-091757, 3rd Generation Partnership Project (3GPP), Mobile Competence Centre, 650, Route Des Lucioles, F-06921 Sophia-Antipolis Cedex, France, No. San Francisco, USA, Apr. 28, 2009, Apr. 28, 2009 (Apr. 28, 2009), XP050339282, [retrieved on Apr. 28, 2009].

Nokia et al., "Multi-Cell CSI-RS Design Aspects" 3GPP Draft; R1-093909 Multi-Cell CSI-RS Design Aspects, 3rd Generation Partnership Project (3GPP), Mobile Competence Centre, 650, Route Des Lucioles ; F-06921 Sophia-Antipolis Cedex, France, No. Miyazaki; Oct. 12, 2009, Oct. 5, 2009 (Oct. 5, 2009), 11 Pages, XP050388411, [retrieved on Oct. 5, 2009], Sections 1, 2.

Nokia et al., "On the Impact of CSI-RS Puncturing to Rel'8 PDSCH Performance", R1-091758, San Francisco, USA, May 4-8, 2009, pp. 6.

Nokia et al: "Transmit Diversity in CSI-RS Subframes", 3GPP Draft; R1-106202, 3rd Generation Partnership Project (3GPP), Mobile Competence Centre ; 650, Route Des Lucioles ; F-06921 Sophia-Antipolis Cedex ; France, vol. RAN WGI, No. Jacksonville, USA; Nov. 15, 2010, Nov. 9, 2010 (Nov. 9, 2010), XP050466933, [retrieved on Nov. 9, 2010].

Nokia, Nokia Siemens Networks, "On the impact of CSI-RS puncturing to Re1'8 PDSCH performance", 3GPP TSG RAN WG1 Meeting #57bis, R1-092557, Los Angeles, USA, Jun. 29-Jul. 3, 2009.

Nokia, Nokia Siemens Networks, "Stage 1 simulation study of RE muting for inter-cell CSI-RS", 3GPP TSG-RAN WG1 Meeting #61, R1-102957, Montreal, Canada, May 10-14, 2010.

NTT Docomo: "CSI-RS Design for LTE-Advanced", 3GPP Draft; R1-101214 CSI-RS Design, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418731, [retrieved on Feb. 16, 2010].

NTT Docomo: "DL CSI-RS Design for LTE-Advanced", 3GPP TSG-RAN WG1#58b R1-094240, Oct. 6, 2009.

NTT Docomo, "Performance Evaluation of RE Muting for Inter-cell CSI-RS" 3GPP TSG RAN WG1 Meeting #61, R1-103254, Montreal, Canada, May 10-14, 2010.

Panasonic: "Downlink CSI-RS design for inter-cell scenarios", 3GPP Draft, R1-093457, 3rd Generation Partnership Project (3GPP), Mobile Competence Centre, 650, Route Des Lucioles, F-06921 Sophia-Anitpolis Cedex, France, No. Shenzhen, China, Aug. 18, 2009, Aug. 18, 2009 (Aug. 18, 2009), XP050351727, [retrieved on Aug. 18, 2009].

Panasonic, "Link level analysis on RE muting for CSI-RS design: Step1 evaluation", 3GPP TSG RAN WG1 Meeting #61, R1-102871, Montreal, Canada, May 10-14, 2010.

Panasonic: "Views on CSI-RS and Rel-8 CRS configuration", 3GPP TSG-RAN WG1#58 R1-093455, Aug. 18, 2009.

Qualcomm Europe: "Details of CSI-RS", 3GPP Draft; R1-094214 CSI-RS Details, 3rd Generation Partnership Project (3GPP), Mobile Competence Centre; 650, Route Des Lucioles ; F-06921 Sophia-Antipolis Cedex ; France, vol. RAN, WG1, No. Miyazaki; Oct. 12, 2009-Oct. 16, 2009, Oct. 9, 2009 (Oct. 9, 2009), XP050597789, [retrieved on Oct. 9, 2009].

Qualcomm Europe, "Downlink RS structure in support of higher-order MIMO", 3GPP TSG-RAN WG1 #57, R1-092050, May 4-8, 2009, San Francisco, USA.

Qualcomm Europe, "Further considerations and link simulations on reference signals in LTE-A", 3GPP, 3rd Generation Partnership Project, No. R1-090875, Feb. 9, 2009 (Feb. 9, 2009), pp. 1-6, XP002616650.

Qualcomm Europe: "UE-RS Patterns for ranks 5 to 8 of LTE-A", 3GPP Draft, R1-094212 UE RS Patterns for Rank 5-8, 3rd Generation Partnership Project (3GPP), Mobile Competence Centre, 650, Route Des Lucioles, F-06921 Sophia-Antipolis Cedex, France, No. Miyazaki, Oct. 12, 2009, Oct. 12, 2009 (Oct. 12, 2009), XP050388682, [retrieved on Oct. 7, 2009].

Qualcomm Inc., "Benefits of Muting for Enhanced CSI Estimation" 3GPP TSG-RAN WG1 #60bis, R1-102332, Apr. 12-16, 2010, Beijing, China.

Qualcomm Inc: "SFBC PDSCH transmission in CSI-RS subframes", 3GPP Draft; R1-104798 SFBC Mapping, 3rd Generation Partnership Project (3GPP), Mobile Competence Centre; 650, Route Des Lucioles; F-06921 Sophia-Antipolis Cedex; France, vol. RAN WGI, No. Madrid, Spain; Aug. 23, 2010, Aug. 17, 2010 (Aug. 17, 2010), pp. 1-6, XP050449990, [retrieved on Aug. 17, 2010].

Qualcomm Inc., "Further Details on CSI-RS", 3GPP TSG-RAN WG1 #60, R1-101485, 7.2.2, Feb. 22-26, 2010, San Francisco, USA, 4 Pages.

Qualcomm Inc, "Further details on CSI-RS. [online]", 3GPP TSG-RAN WG1 #59bis R1-100681, Jan. 12, 2010.

Qualcomm Incorporated: "Finalizing Signaling and Configuration of CSI-RS", 3GPP Draft; R1-105565 Finalizing Signaling and

(56) References Cited

OTHER PUBLICATIONS

Configuration of CSI-RS, 3rd Generation Partnership Project (3GPP), Mobile Competence Centre ; 650, Route Des Lucioles ; F-06921 Sophia-Antipolis Cedex ; France, vol. RAN WGI, No. Xian; Oct. 11, 2010, Oct. 5, 2010 (Oct. 5, 2010), XP050450663, [retrieved on Oct. 5, 2010].

Samsung, "Discussions on CSI-RS for LTE-Advanced", 3GPP Draft, R1-093375 CSI RS Designs in LTE-A, 3rd Generation Partnership Project (3GPP), Mobile Competence Centre , 650, Route Des Lucioles , F-06921 Sophia-Antipolis Cedex , France, No. Shenzhen, China, Aug. 19, 2009, Aug. 19, 2009 (Aug. 19, 2009), XP050351673, Sections 1, 2.

Samsung, "Discussions on CSI-RS for LTE-Advanced", 3GPP TSG RAN WG1 #57bis, R1-092651, Los Angeles, USA, Jun. 29-Jul. 3, 2009.

Samsung: "Discussions on CSI-RS for LTE-Advanced", 3GPP TSG-RAN WG1#57 R1-092204, May 5, 2009.

Samsung: "Necessity of Orthogonal Inter-cell CSI-RS Patterns", 3GPP Draft; R1-101156 Orthogonal CSI-RS Pattern, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418696, [retrieved on Feb. 16, 2010].

Samsung, "Performance evaluation for CSI-RS design", 3GPP TSG RAN WG1 #59bis, R1-100106, Valencia, Spain, Jan. 18-22, 2009.

Taiwan Search Report—TW099134524—TIPO—dated Oct. 4, 2013.

Texas Instruments: "Multiplexing and Signaling Support for Downlink COMP", 3GPP Draft, R1-091292 TI DL COMP, 3rd Generation Partnership Project (3GPP), Mobile Competence Centre, 650, Route Des Lucioles, F-06921 Sophia-Antipolis Cedex, France, No. Seoul, Korea, Mar. 18, 2009, Mar. 18, 2009 (Mar. 18, 2009), XP050338899, [retrieved on Mar. 18, 2009].

Texas Instruments, "PDSCH Muting for Inter-cell CSI estimation: Rel-8 UE Performance", 3GPP TSG RAN WG1 #61, R1-102819, Montreal, Canada, May 10-14, 2010.

"UE-RS Patterns for Rank 3-4", 3GPP TSG-RAN WG1 #58bis, R1-094211, Oct. 12-16, 2009,pp. 8, Miyazaki, Japan.

"Way forward on CoMP and MIMO DL RS—Outcome of ad hoc discussions" Tdoc R1-090529,3GPP TSG-RAN-WG1 #55bis, Jan. 12-16, 2009, Ljubljana, Slovenia.

ZTE Corporation, "CSI-RS Pattern Design for LTE-Advanced", 3GPP TSG-RAN WG1 Meeting #60 R1-100969, Feb. 18, 2010, pp. 1-7, URL: http://www.3gpp.org/ftp/tsg_ran/wg1_rl1/TSGR1_60/Docs/.

ZTE, "CSI-RS Muting Evaluation", 3GPP TSG RAN WG1 Meeting #61, R1-102900, Montreal, Canada, May 10-14, 2010.

ZTE: "DL Reference Signal Design for CSI generation in LTE-Advanced", 3GPP TSG-RAN WG1#57 R1-091714, Apr. 28, 2009.

ZTE, "Resource Mapping Issues on JP transmission in CoMP", 3GPP Draft, R1-090070 Resource Mapping Issues on JP Transmission in CoMP, 3rd Generation Partnership Project (3GPP), Mobile Competence Centre , 650, Route Des Lucioles , F-06921 Sophia-Antipolis Cedex , France, No. Ljubljana, Jan. 7, 2009, Jan. 7, 2009 (Jan. 7, 2009), XP050318014.

* cited by examiner

METHOD AND APPARATUS FOR USING CHANNEL STATE INFORMATION REFERENCE SIGNAL IN WIRELESS COMMUNICATION SYSTEM

CROSS-REFERENCE TO RELATED APPLICATION

The present application is a continuation of U.S. application Ser. No. 12/899,448, entitled "METHOD AND APPARATUS FOR USING CHANNEL STATE INFORMATION REFERENCE SIGNAL IN WIRELESS COMMUNICATION SYSTEM," filed Oct. 6, 2010, which claims the benefit of priority from U.S. Provisional Patent Application Ser. No. 61/249,906, entitled "METHOD AND APPARATUS FOR USING A CHANNEL SPATIAL INFORMATION REFERENCE SIGNAL IN A WIRELESS COMMUNICATION SYSTEM," filed on Oct. 8, 2009, and U.S. Provisional Application Ser. No. 61/257,187, entitled "METHOD AND APPARATUS FOR USING A CHANNEL SPATIAL INFORMATION REFERENCE SIGNAL IN A WIRELESS COMMUNICATION SYSTEM," filed on Nov. 2, 2009, both of which are hereby incorporated by reference in their entirety.

BACKGROUND

I. Technical Field

The present disclosure relates generally to communication, and more specifically to techniques for transmitting a reference signal in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In wireless communication systems, such as the Release 8 and Release 9 versions of the Long Term Evolution (LTE) standard (referred to as Rel-8 and Rel-9), signal transmissions are defined for up to four-antenna transmission configurations. With an increased demand to support higher data rates and throughput (system capacity), wireless systems with a higher number of transmission antennas (e.g., eight) have recently received attention. To accommodate the increased number of transmission antennas and to further improve system performance, certain additional reference signal transmissions, e.g., the channel state (or spatial) Information reference signal (CSI-RS), have recently been proposed.

However, introducing such new reference signals raises issues related to available transmission bandwidth and coexistence with legacy (e.g., Rel-8 and Rel-9) reference signals. Furthermore, the introduction of new reference signals raises the issue of backward compatibility with user equipment not designed to operate with the new reference signals.

A better method and system for implementing the channel state information reference signal are needed.

SUMMARY

The disclosed designs meet the above-discussed, and other, needs for using new reference signals, such as CSI-RS, in a wireless communication system.

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method for wireless communication is disclosed. The method includes selecting a cell-specific channel station information reference signal (CSI-RS) resource pattern comprising a pattern of resource elements assigned to the transmission of the CSI-RS signal within a CSI-RS subframe, the cell-specific CSI-RS resource pattern being non-colocated with an other resource pattern assigned to a reference signal other than the CSI-RS, the CSI-RS subframe not including a synchronization signal, a paging signal and/or a broadcast signal. The method further includes allocating the cell-specific CSI-RS resource pattern to a plurality of antennas for transmitting the CSI-RS by grouping the CSI-RS resource pattern in a plurality of groups of resource elements and assigning each group of resource elements to a different antenna of the plurality of antennas. The method also includes transmitting, using the plurality of antennas, the cell-specific CSI-RS resource pattern.

In another aspect, an apparatus for wireless communication comprising means for selecting a first resource pattern comprising resource elements, the first resource pattern being non-colocated with a second resource pattern and means for allocating the first resource pattern to a plurality of antennas for transmitting a channel state information reference signal (CSI-RS) is disclosed.

In another aspect, an apparatus for wireless communication is disclosed which includes a processor and a memory. The processor and the memory are configured to select a cell-specific channel state information reference signal (CSI-RS) resource pattern comprising a pattern of resource elements assigned to the transmission of the CSI-RS signal within a CSI-RS subframe, the cell-specific CSI-RS resource pattern being non-colocated with an other resource pattern assigned to a reference signal other than the CSI-RS, the CSI-RS subframe not including a synchronization signal, a paging signal, and/or a broadcast signal. The processor and the memory are also configured to allocate the cell-specific CSI-RS first resource pattern to a plurality of antennas for transmitting the CSI-RS by grouping the CSI-RS resource pattern in a plurality of groups of resource elements and assigning each group of resource elements to a different antenna of the plurality of antennas. The processor and the memory are also configured to transmit, using the plurality of antennas, the cell-specific CSI-RS resource pattern.

In another aspect, a computer program product is provided with includes a computer-readable storage medium comprising instructions for causing at least one computer to select a first resource pattern comprising resource elements, the first resource pattern being non-colocated with a second resource pattern and instructions for causing the at least one computer to allocate allocating the first resource pattern to a plurality of antennas for transmitting a channel state information reference signal (CSI-RS).

In another aspect, a method for wireless communication is disclosed. The method comprises coordinating, with a base station of a neighboring cell, a resource pattern allocated to the transmission of the reference signal and muting, based on the coordination, one or more locations of the resource pattern.

In another aspect, an apparatus for wireless communication comprising means for coordinating, with a base station of a neighboring cell, a resource pattern allocated to the transmission of the reference signal, and means for muting, based on the coordination, the resource pattern at locations corresponding resource pattern allocated in the neighboring cell is disclosed.

In another aspect, a method for wireless communication is disclosed. The method comprises receiving, by a user equipment (UE), a channel state information reference signal (CSI-RS) in a CSI-RS subframe according to a cell-specific CSI-RS resource pattern comprising a pattern of resource elements assigned to the transmission of the CSI-RS signal within the CSI-RS subframe, the cell-specific CSI-RS resource pattern being non-colocated with an other resource pattern assigned to a reference signal other than the CSI-RS, the CSI-RS subframe not including a synchronization signal, a paging signal, and/or a broadcast signal. The method also includes performing, by the UE, a channel quality estimate based on the CSI-RS. The method also includes reporting, by the UE, the channel quality estimate to a base station.

In another aspect an apparatus for wireless communication, comprising means for receiving a first resource pattern comprising resource element groups that are non-colocated with a second resource pattern, means for receiving a channel state information reference signal (CSI-RS) according to the first resource pattern and means for performing a channel quality estimate based on the channel state information reference signal is disclosed.

In another aspect, a computer program product, comprising a non-volatile computer-readable medium comprising instructions for causing at least one computer to receive a first resource pattern comprising resource element groups that are non-colocated with a second resource pattern, instructions for causing the at least one computer to receive a channel state information reference signal (CSI-RS) according to the first resource pattern and instructions for causing the at least one computer to perform a channel quality estimate based on the channel state information reference signal is disclosed.

In another aspect, an apparatus for wireless communication is disclosed which includes a processor, an antenna controlled by the processor, and a memory in communication with the processor. The processor and the memory are configured to receive, via the antenna, a channel state information reference signal (CSI-RS) in a CSI-RS subframe according to a cell-specific CSI-RS resource pattern comprising a pattern of resource element assigned to the transmission of the CSI-RS signal within the CSI-RS subframe, the cell-specific CSI-RS resource pattern being non-colocated with an other resource pattern assigned to a reference signal other than the CSI-RS, the CSI-RS subframe not including a synchronization signal, a paging signal, and/or a broadcast signal. The processor and the memory are also configured to perform a channel quality estimate based on the CSI-RS. The processor and the memory are also configured to report, via the antenna, the channel quality estimate to a base station.

Various aspects and features of the disclosure are described in further detail below.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
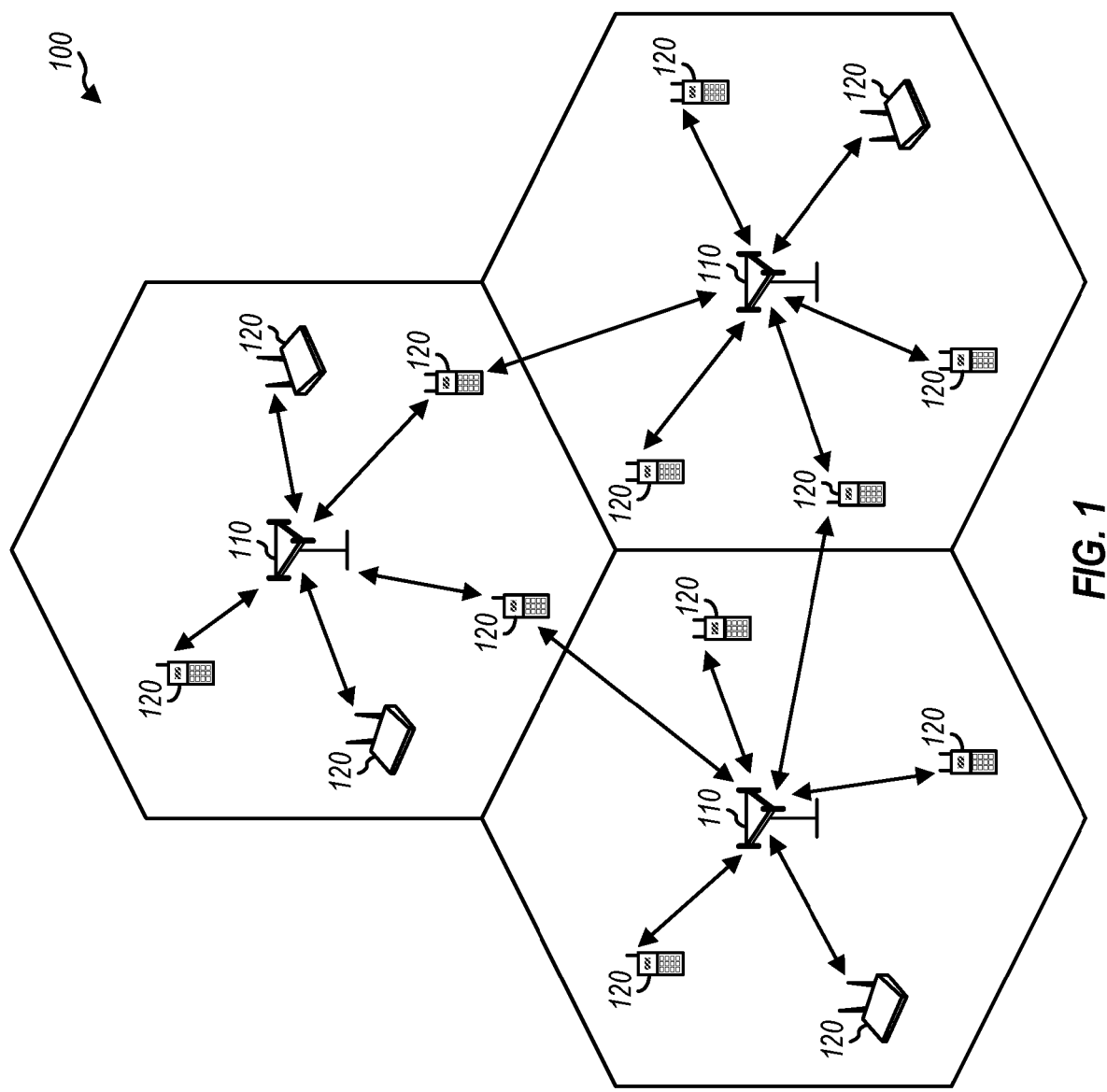
FIG. 1 illustrates an exemplary wireless communication system.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

The DL PHY channels may include: Physical Downlink Shared Channel (PDSCH), Physical Broadcast Channel (PBSH), Physical Multicast Channel (PMCH), Physical Downlink Control Channel (PDCCH), Physical Hybrid Automatic Repeat Request Indicator Channel (PHICH), and Physical Control Format Indicator Channel (PCFICH).

The UL PHY Channels may include: Physical Random Access Channel (PRACH), Physical Uplink Shared Channel (PUSCH), and Physical Uplink Control Channel (PUCCH).

While various designs are discussed below with reference to CSI-RS, it is understood that CSI-RS is only an illustrative example of an additional reference signal that may be introduced to a wireless communication system. Therefore, the considerations and designs provided below are applicable to other known or future reference signals as well.

In previous releases of the LTE specification, a single reference signal was defined for channel quality measurement and for data demodulation. LTE-A has defined two forms of references signals for demodulation and channel quality measurement: the demodulation reference signal (DM-RS) and the channel state information reference signal (CSI-RS). A base station (eNodeB or eNB) may schedule and transmit these reference signals to UEs. The UEs may use CSI-RS to perform channel quality measurements and provide feedback on the channel quality or spatial properties. Various properties of CSI-RS, including allocation of transmission resources, backward compatibility with previously deployed UEs and the coordination with CSI-RS transmissions in neighboring cells, are disclosed in greater detail below.

FIG. 1 illustrates a wireless communication system 100, which may be an LTE system or some other system. System 100 may include a number of evolved Node Bs (eNBs) 110 and other network entities. An eNB 110 may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system, and each UE 120 may be stationary or mobile. A UE 120 may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 mega-Hertz (MHz), respectively. The system bandwidth may correspond to a subset of the K total subcarriers.

Figure 2:
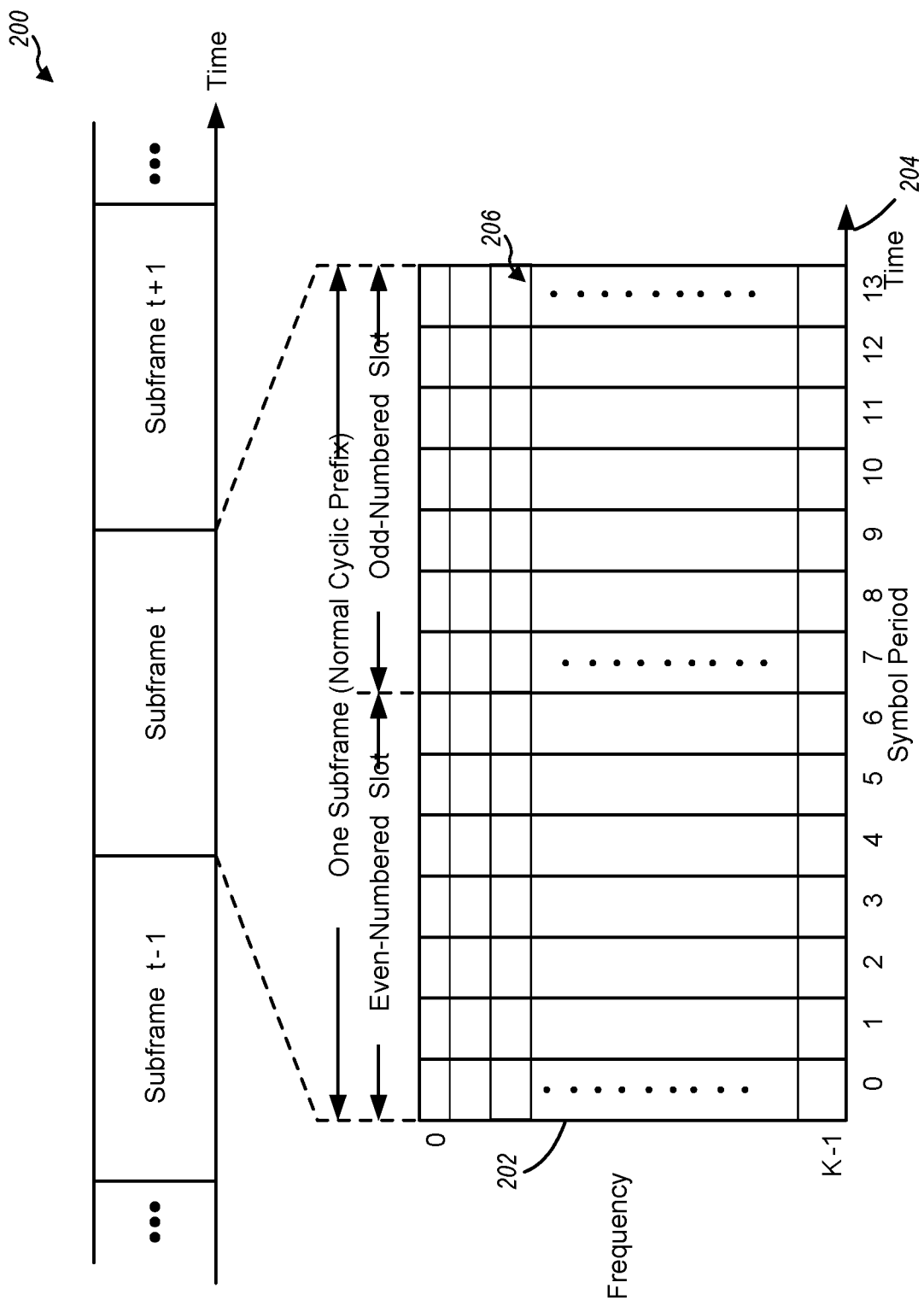
FIG. 2 illustrates an exemplary transmission structure.

FIG. 2 illustrates a transmission structure 200 for the downlink in the LTE. The transmission timeline may be partitioned into units of subframes. Each subframe may have a predetermined duration, e.g., one millisecond (ms), and may be partitioned into a number of slots (e.g., two slots). Each slot may cover seven OFDM symbol periods for a normal cyclic prefix (shown along horizontal axis 204 in FIG. 2) or six symbol periods for an extended cyclic prefix (not shown in FIG. 2). A number of transmission resource blocks may be defined for each slot. Each resource block may cover 12 subcarriers (depicted along vertical axis 202) in one slot. The number of resource blocks in each slot may be dependent on the system bandwidth and may range from 6 to 110 for system bandwidth of 1.25 MHz to 20 MHz, respectively. The available resource blocks may be assigned to various downlink transmissions. For the extended cyclic prefix (not shown in FIG. 2), the two slots in one subframe may include 12 symbol periods with indices of 0 through 11.

In some designs, a resource element (RE) 206 may be a unit of transmission resource scheduled for downlink transmissions. In some designs, one RE 206 may correspond to one symbol (or codeword) of downlink transmission. The REs 206 made available for downlink transmission of a particular signal may form a "pattern," when depicted along a two-dimensional grid, such as depicted in FIG. 2. The assignment of REs for transmission of a signal may therefore be referred to as the pattern of transmission of that signal. Furthermore, the term "location of an RE" may refer to the time (OFDM symbol) and frequency (subcarrier) associated with one of the RE within a subframe or a resource block, or may informally refer to the position of the RE 206 in a two-dimensional representation of transmission resources available in a subframe or a resource block, e.g., as shown in FIG. 2.

The transmission overhead associated with CSI-RS may need to trade off both LTE-A and legacy LTE performance. To assign transmission resources, e.g., REs 206, for transmission of CSI-RS, an eNB 110 may perform a trade-off between the effectiveness of CSI-RS for improving channel performance and the impact of the reduced availability of transmission resources for data traffic. In particular, CSI-RS may puncture or take away transmission resources from data transmission for legacy UEs 120. Therefore, increasing the overhead of CSI-RS may degrade performance or data transmission rate to legacy UEs 120. On the other hand, if CSI-RS is allocated too few transmission resources, a receiver may not be able to perform adequate channel estimation based on the received CSI-RS. Therefore, CSI-RS transmissions may be transmitted often (e.g., between 2 to 10 milliseconds) and covering a sufficient frequency range (e.g., the bandwidth of the entire channel) to provide an adequate channel estimation performance for different single-cell and multi-cell transmission schemes.

In some designs, the transmission resource issue may be addressed by controlling a density of REs 206 allocated to CSI-RS transmissions. The term "density" here refers to a measure of how many of the total available transmission resources (e.g., tones, time slots or codes) are allocated to the transmission of CSI-RS. In some designs, the density of transmission resources may be controlled by limiting the number of REs 206 allocated for CSI-RS transmission in a resource block (RB). In some designs, the density of transmission resources may be controlled by adjusting the duty cycle of CSI-RS transmissions. The term "duty cycle" refers to the periodicity of CSI-RS transmissions. For example, a 2 millisecond (ms) duty cycle may mean that CSI-RS is transmitted once every 2 ms. In some designs, the density of transmission resources may be controlled by limiting the number of subframes comprising CSI-RS transmissions. These and other aspects of controlling the density of CSI-RS transmission resources are described in greater detail below.

A study has shown that CSI-RS with frequency density of 2RE/RB and 10 ms duty cycle may provide reasonable LTE-A performance for single user MIMO (SU-MIMO). Some studies have suggested that densities higher than 2RE/RB per antenna port may result in a significant loss of UE performance, especially for a modulation and coding scheme (MCS) with high coding rate. In some designs, a scheduler at the eNB 110 may reduce the impact of performance loss for legacy UEs 120 by taking into account the loss in performance in rate prediction of the scheduled UE 120 based on the transmission density of CSI-RS. In some designs, the eNB 110 may schedule legacy UEs 120 with the requested MCS with lower coding rates. In some designs the eNB 110, to avoid CSI-RS transmissions from impacting legacy UE 120, may schedule only LTE-A users in subframes in which CSI-RS is transmitted. In some designs, a frequency density of 2RE/RB per antenna port may be a reasonable tradeoff between performance and overhead. In other designs, a fixed density of 1 RE/RB may be a reasonable tradeoff. The number of RE/RB per antenna port allocated to CSI-RS may be a fixed, predetermined number. Note that a fixed quota of RE per RB simply implies allocating a certain number of REs in the RB in which CSI-RS transmission is scheduled, and may not mean that every RB scheduled by the eNB 110 includes that many REs for CSI-RS transmissions.

As will be discussed below, in some designs, a particular density number may be mapped to a particular frequency spacing between allocated REs. For example, in certain designs provided below, a density of 2 RBs/RE may correspond to a frequency spacing of 6 subcarriers between CSI-RS REs 206. It may be appreciated that this spacing is similar to the Rel-8 common (or cell-specific) reference signal (CRS) spacing. In certain designs, having a subcarrier spacing similar to CRS may make it possible to leverage a CRS demodulation structure at a receiver for demodulating CSI-RS.

In some designs, the duty cycle of CSI-RS may be configurable in a (semi)static way to a limited set of values, e.g., 2, 5 or 10 ms. The operational value of the duty cycle may be signaled to an LTE-A UE 120 through an information block in a broadcast channel. In some designs, a different duty cycle may be specified for each antenna port. In some designs, the same value of duty cycle may be defined for all antenna ports defined in a cell. Using the same value of duty cycle may reduce signaling overhead and computational complexity associated with simultaneously scheduling and using different duty cycle values for different antenna ports.

Figure 3:
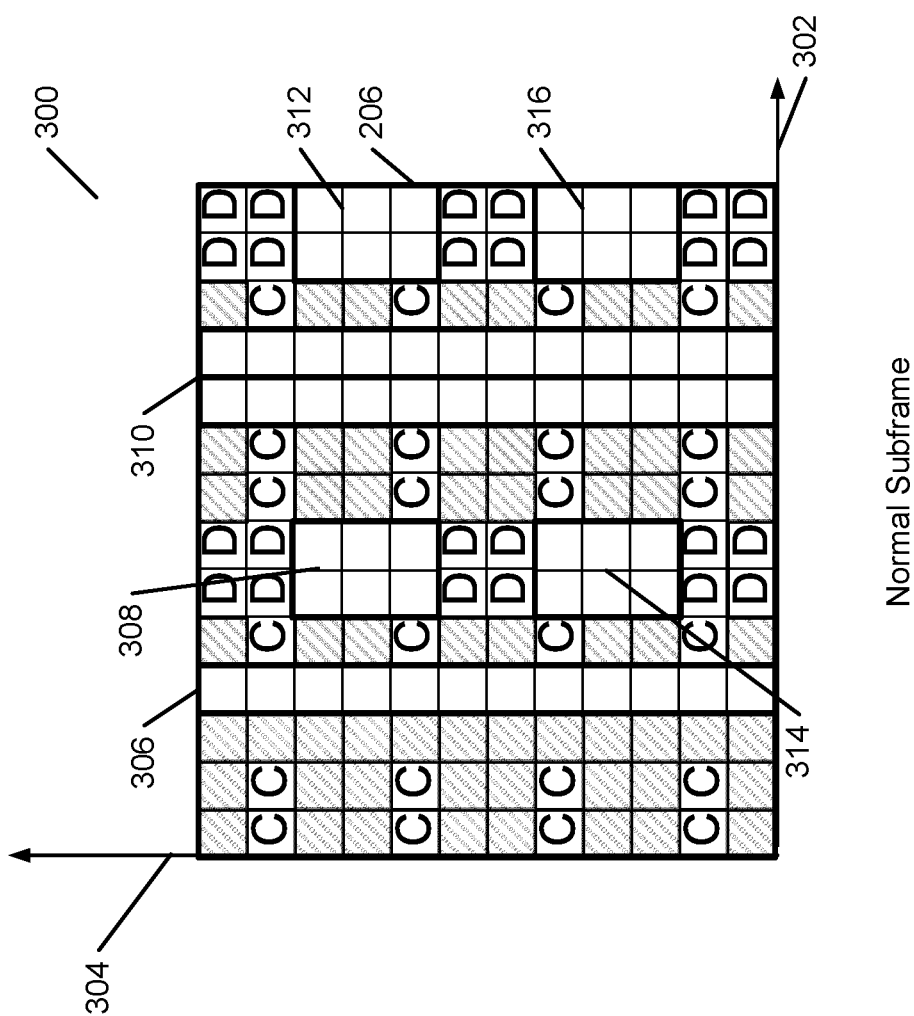
FIG. 3 illustrates a resource allocation pattern for a normal cyclic prefix (CP) subframe.

FIG. 3 depicts a normal CP subframe 300, with the horizontal axis 302 representing symbols transmitted (time) and the vertical axis 304 representing frequency. As discussed previously, each "tile" of the subframe 300 may therefore represent a single RE 206 available for transmission. In some designs, a transmission in an RE 206 may further be code division multiplexed with another transmission in the same RE 206.

In LTE systems, certain REs 206 have been allocated to transmission of control signals (e.g., control region) at the start of each subframe. In FIG. 3, the REs 206 corresponding to these allocated REs 206 are hatch-marked. Although the control region is shown to span 3 OFDM symbols in the present example, it is understood that the control region may span a different number of OFDM symbols in other examples. Additionally, certain REs 206 are allocated to a Common (or Cell-Specific) Reference Signal (CRS). The CRS is shifted in positions, based on an identity of the eNB 110 of a particular cell, in RBs. In FIG. 3, the tiles marked "C" represent REs 206 that may be used for CRS transmission. Furthermore, REs 206 allocated to transmission of demodulation reference signals (DM-RS) (also referred to as UE-specific reference signal or UE-RS), in LTE Release 9, are marked as "D." In some designs, the REs 206, so allocated to other control and reference signals, may not be allocated to CSI-RS. One of ordinary skill in the art would understand that REs 206 being allocated to transmission of a certain control or reference signal need not mean that the control/reference signal is present in every scheduled RB, but simply mean that when the particular control/reference signal is transmitted, it will be transmitted in one or more of the allocated RE locations. Accordingly, in certain designs, only RE regions marked 306, 308, 310, 312, 314 and 316 may be available for the transmission of CSI-RS. In certain designs, because CRS are transmitted with a cell dependent offset, an entire OFDM symbol (hatch-marked) in which a CRS is presented may be avoided for the transmission of CSI-RS. This helps prevent CSI-RS colliding with CRS of neighboring cells in a synchronous network.

Figure 4:
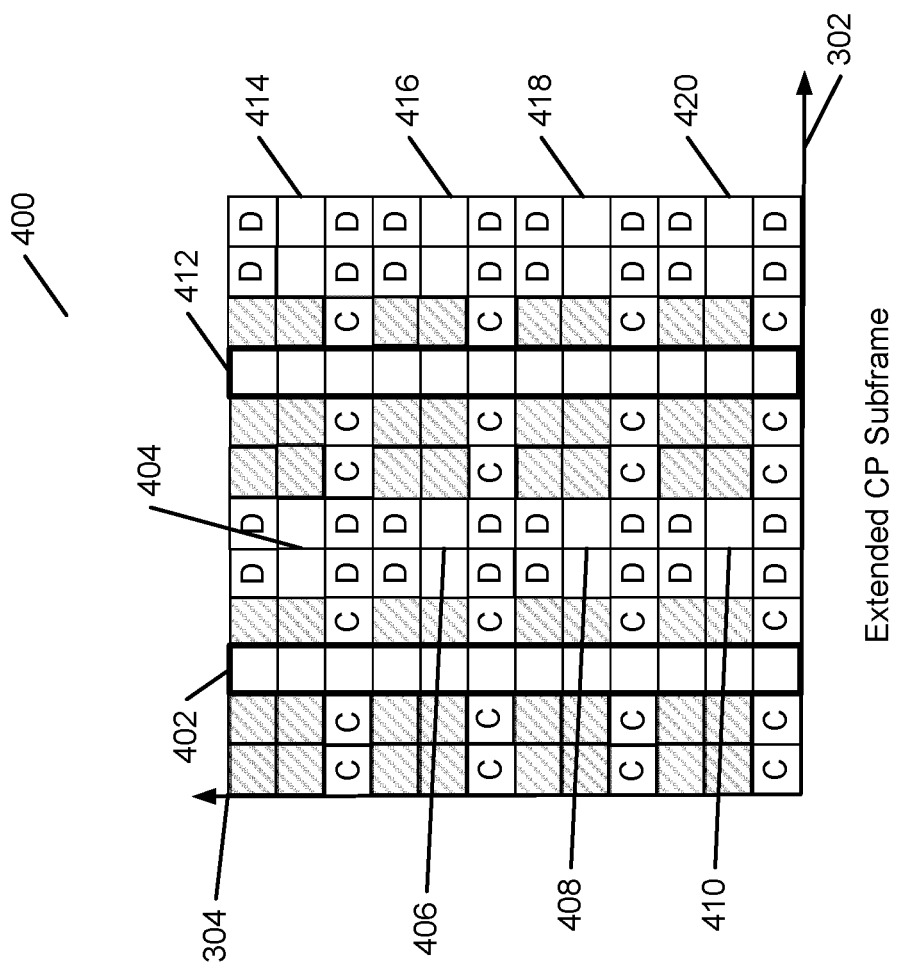
FIG. 4 illustrates a resource allocation pattern for an extended CP subframe.

FIG. 4 depicts an extended CP subframe 400, showing REs 206 assigned to DM-RS and CRS, marked with "D" and "C," respectively. As discussed previously, REs 206 in the regions 402, 404, 406, 408, 410, 414, 416, 418 and 420 may be available for CSI-RS transmissions. The DM-RS REs 206 shown in FIG. 4 may correspond to the DM-RS REs for rank 2 in LTE Release 9. In general, other DM-RS locations are also possible. Note that the depicted DM-RS density for normal CP subframe 300 (FIG. 3) is 24 RE/RB and is 32 RE/RB for the extended CP subframe 400. In these designs, the maximum number of available REs 206 for CSI-RS transmission may therefore be 60 and 40 RE/RB for normal and extended CP subframes, respectively.

Figure 5:
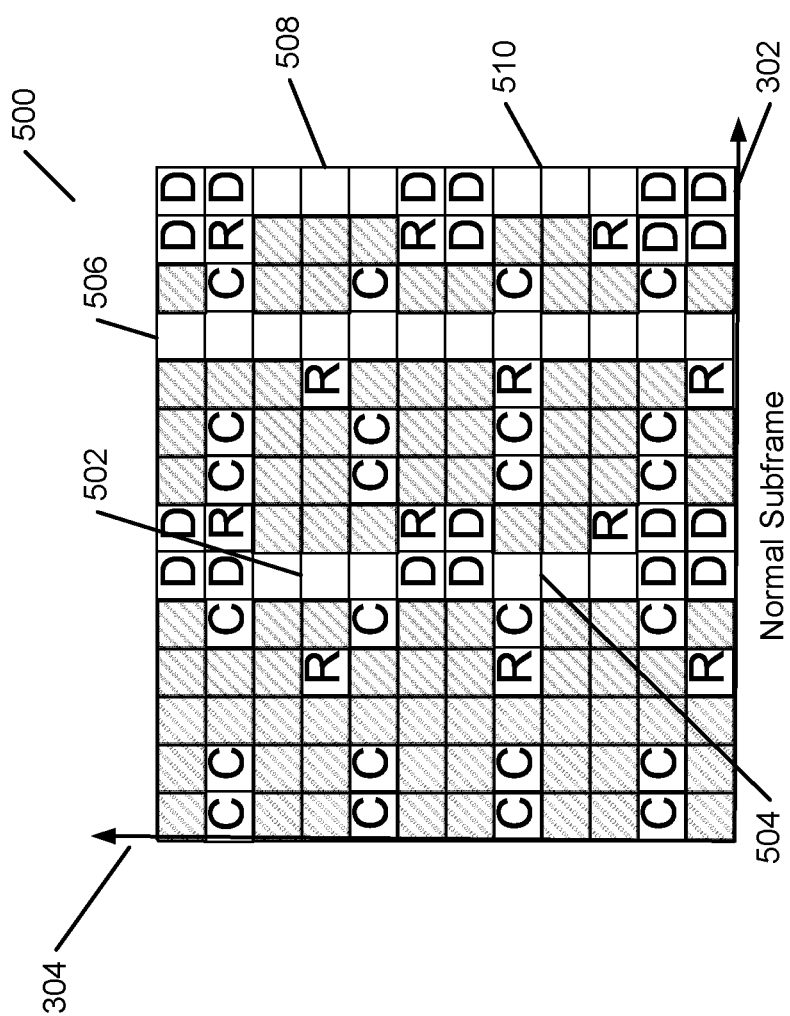
FIG. 5 illustrates another resource allocation pattern for a normal CP subframe.

With reference to FIG. 5, a subframe 500 that includes REs 206 allocated to yet another reference signal is shown. Certain designs may additionally avoid collision of CSI-RS with symbols that could be used for Rel-8 downlink reference signal (DRS) (also referred to as UE-specific reference signal or UE-RS), depicted as tiles "R" in FIG. 5. The DRS signals are transmitted in TDD mode and the locations (REs 206 used) for DRS depend on cell ID. In such designs, then the number of available REs 206 for CSI-RS may reduce to 24 REs, depicted as regions 502, 504, 506, 508 and 510 in the subframe 500 of FIG. 5. Alternatively, in some other designs only REs 206 used by DRS during an actual allocation/transmission may be excluded instead of excluding the entire RE location. In other words, the CSI-RS pattern for each cell may be initialized to not overlap with DRS pattern of that particular cell.

From FIGS. 3, 4 and 5, it may be seen that, in designs that avoid co-location with patterns used for other reference signals and legacy reference signals, the number of REs 206 available for CSI-RS may be limited to a smaller subset. In some designs, REs 206 allocated to CSI-RS transmissions from a particular antenna port may be selected from among all available CSI-RS RE 206 locations to achieve a uniform spacing of transmissions from the particular antenna port across the frequency range. The uniform spacing constraint may further limit the total number of REs 206 available for CSI-RS transmissions from all antenna ports. In designs where CSI-RS is uniformly spaced across the frequency range, demodulation of CSI-RS may be simplified, as previously discussed. Furthermore, using uniformly spaced REs 206 for transmission of CSI-RS may provide a more accurate channel quality estimate over the entire frequency range. In some designs, REs 206 allocated to CSI-RS corresponding to a particular antenna port may be uniformly spaced in frequency. Thus, in certain designs, CSI-RS port of a cell may be allocated uniformly spaced subcarriers in one given symbol.

In certain designs, REs 206 allocated to DM-RS may be excluded from CSI-RS (e.g., as shown in FIGS. 3 and 4). As previously discussed, this may further reduce the number of available REs for CSI-RS transmissions. For example, in the subframe 300, the number of available REs 206 for CSI-RS may be reduced to 36. To remedy the reduction in available REs 206 for CSI-RS transmissions, in some designs that exclude DM-RS symbols, the number of CRS antenna ports may be limited to 2. By limiting the number of CRS antenna ports to 2, the OFDM symbol containing CRS for antenna ports 2 and 3 may be used for CSI-RS transmissions. This re-allocation of CRS may increase the number of available CSI-RS symbols to 48 in a normal subframe.

Figure 6:
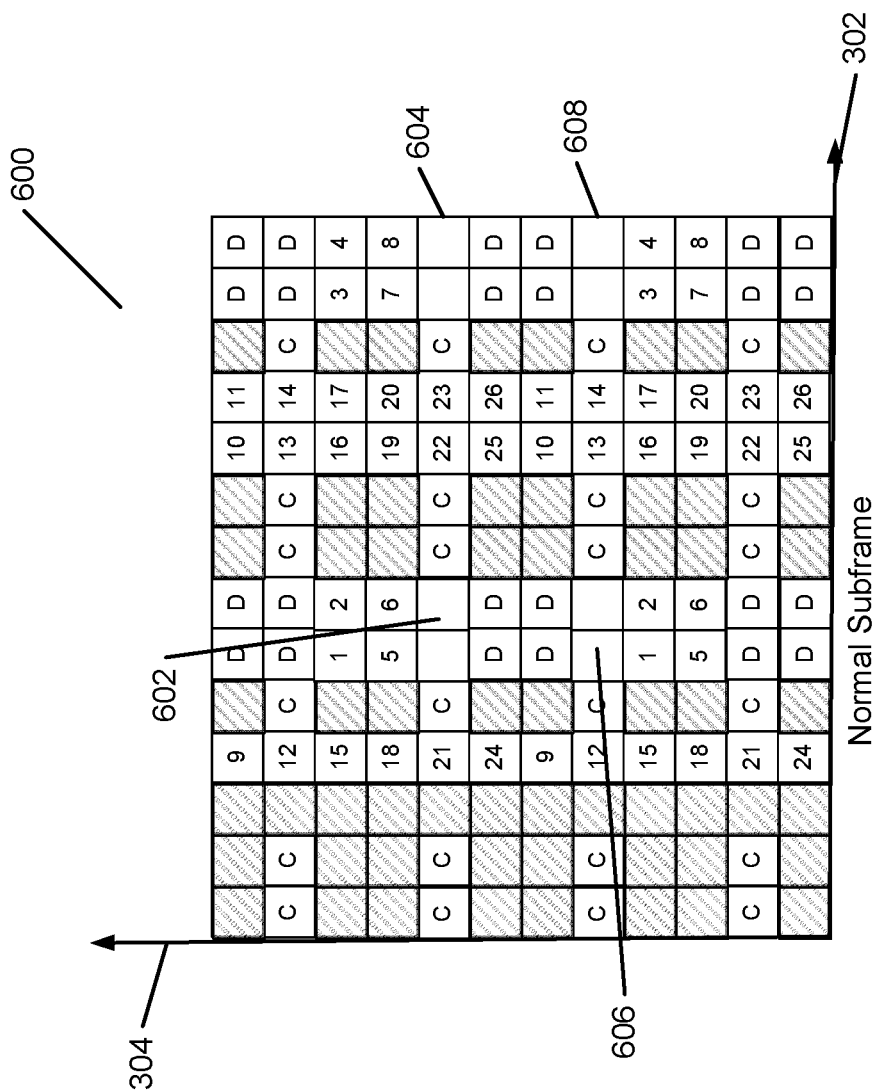
FIG. 6 illustrates yet another resource allocation pattern for a normal CP subframe.
Figure 7:
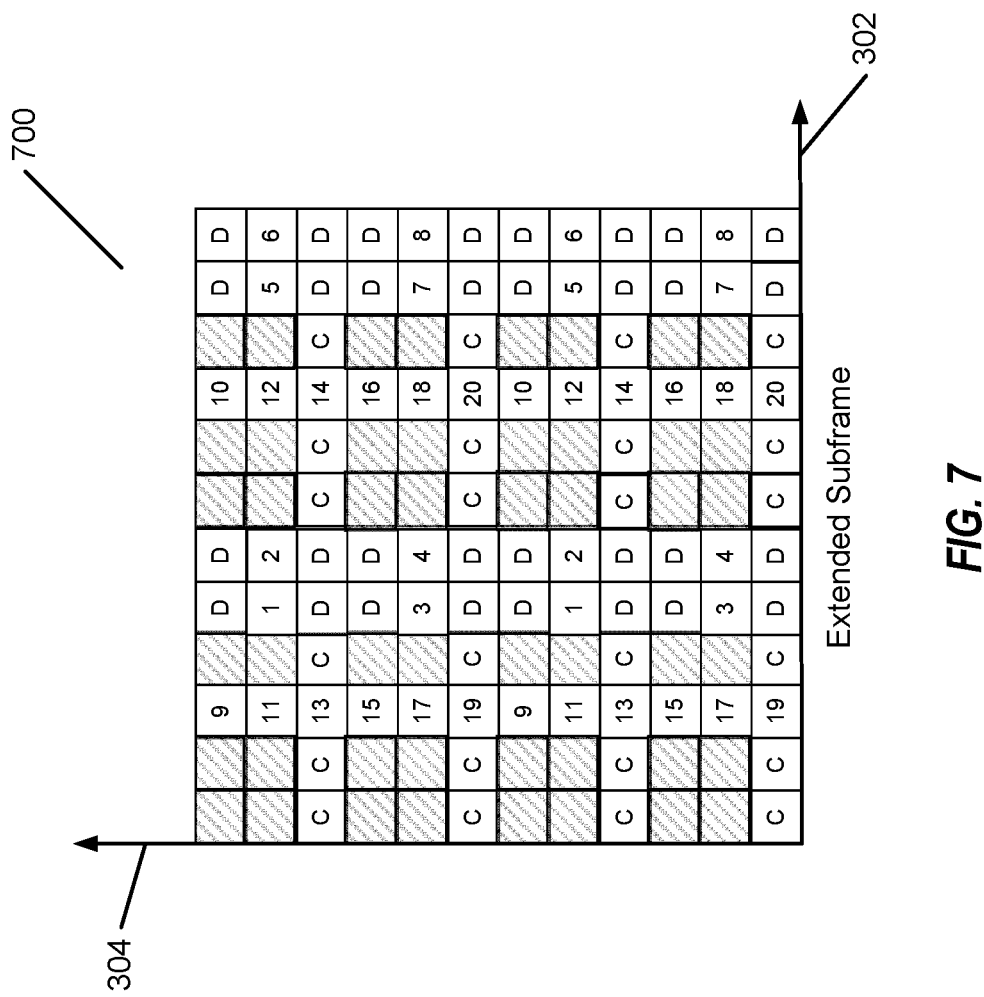
FIG. 7 illustrates another resource allocation pattern for an extended CP subframe.

Referring now to FIGS. 6 and 7, in particular, the above property can also provide a uniform structure for CSI-RS for extended CP and normal CP subframes. For a design that uses 2RE/RB allocation to CSI-RS, it is possible to group the available REs 206 into groups of REs 206 (e.g., pairs as depicted in FIGS. 6 and 7). Each pair includes two REs 206 in the same RB with the same frequency spacing (e.g., frequency spacing 6 subcarriers in FIGS. 6 and 7). For example, FIG. 6 illustrates pairing of REs 206, as shown in FIG. 3. REs 206 with same numbers in FIG. 6 may form a pair, and may be spaced 6 subcarriers apart with respect to each other and also with respect to the corresponding REs 206 in an adjacent RB (not shown in FIG. 6). In other words, when contiguous RBs are assigned to CSI-RS transmissions, the pattern of RE 206 allocation may be uniform not just within one RB, but across multiple RBs as well (i.e., uniformity along both horizontal and vertical axes in FIG. 6). As can be seen from FIG. 6, 26 pairs of REs 206 may be possible with a frequency spacing of 6, with 52 REs from 60 available REs depicted in FIG. 3 being used for CSI-RS. It will be appreciated that if 1 RE/RB per port is assigned to CSI-RS, each available RE 206 in FIG. 6 (total 60 REs 206) may be assigned a unique number from 1 to 60 and may be available for assignment to an antenna port.

FIG. 7 illustrates another pairing example in which 20 RE pairs are formed using all 40 available REs 206 depicted in FIG. 4 for an extended CP subframe. In certain designs, each RE pair may be used for one CSI-RS antenna port per RB.

It will be appreciated that while a given cell may need a limited number of REs 206 for CSI-RS transmissions (for example, an 8-antenna configuration needs 8 assignments, one per antenna port), the available REs 206 depicted in FIG. 6 or 7 could be shared among neighboring cells such that the eNBs 110 of neighboring cells do not use the same REs 206. For example, with reference to FIG. 6, one eNB 110 may use REs 206 numbered 1 to 8, while a neighboring eNB 110 may use REs 206 numbered 9 to 16 for CSI transmissions. Therefore, neighboring cells may be able to avoid CSI-RS collisions by coordinating RE allocation among the eNBs 110.

Figure 8:
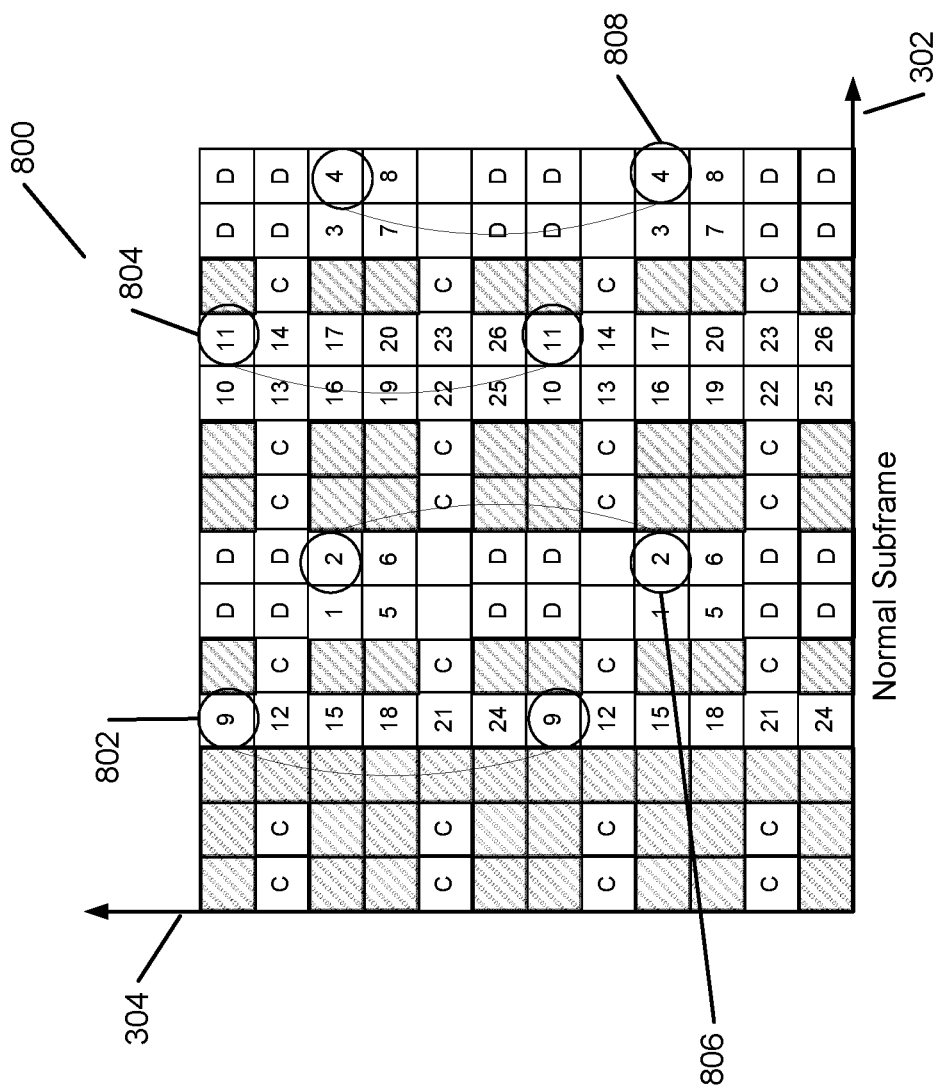
FIG. 8 illustrates yet another resource allocation pattern for a normal CP subframe.

FIG. 8 illustrates an example subframe 800, wherein four RE pairs 802, 804, 806 and 808 that may be assigned to CSI-RS antenna ports. The RE pairs 802, 804, 806 and 808 may be chosen to have uniform spacing across both frequency and time. The uniform assignment, as depicted in subframe 800, may help avoid disproportionate "crowding" of REs 206, burdening legacy UE 120 transmissions in some subframes. This may ensure that CSI-RS punctures all codeblocks substantially equally for legacy UEs 120 that are scheduled with more than one codeblock.

In certain designs, the assigned locations of RE pairs for CSI-RS may be cell-dependent and may be initialized as a function of a physical cell ID and number of CSI-RS antenna ports. Therefore, in certain designs, the OFDM symbols with available REs 206 for CSI-RS may be partitioned into two sets: a first set having the first slot of a subframe and the other group having the second slot of the subframe. In certain designs, to reduce impact on data traffic of legacy UEs 120, the initialization procedure of the CSI-RS pattern may ensure that the OFDM symbols used for CSI-RS transmissions alternate between the two partitions of the OFDM symbols, or equivalently two slots, as described above.

Figure 9:
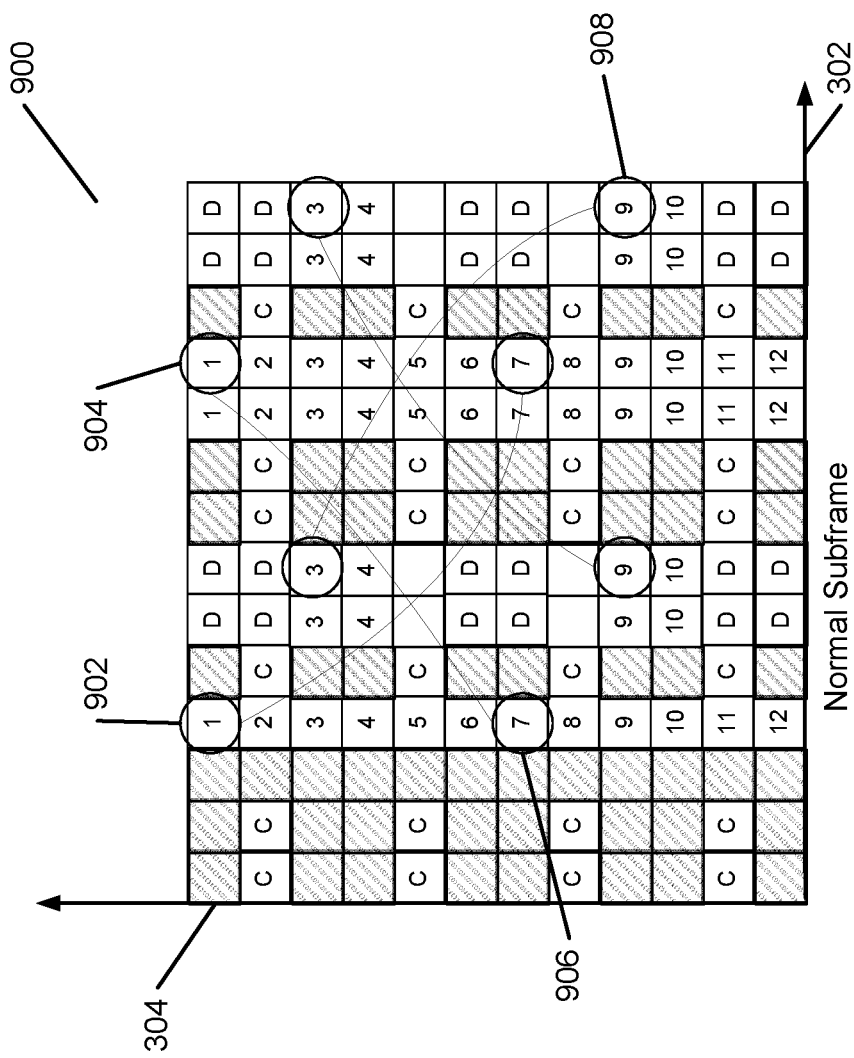
FIG. 9 illustrates yet another resource allocation pattern for a normal CP subframe.

Referring now to FIG. 9, an example resource assignment is shown for a normal subframe 900. In the depicted example subframe 900, CSI-RS locations of a given antenna port may occupy evenly spaced subcarriers in different OFDM symbols. The REs 206 available for CSI-RS transmission are numbered from 1 to 12. For a desired uniform frequency spacing (e.g., 6 in this example), two REs 206 having the desired uniform spacing (e.g., 6 in this example) may be assigned to CSI-RS. For example, any RE 206 with number 1 can be paired with any RE 206 with number 7 and represent the locations for transmission of one CSI-RS antenna port. Four pairs of REs: 902, 904, 906 and 908, are depicted in the normal subframe 900. The pairs 902, 904, 906 and 908 are uniformly spaced across both horizontal (time) and vertical (frequency) axes 302, 304.

Still referring to FIG. 9, it may be appreciated that that the CSI-RS antenna ports can be mapped to different reserved RE 206 locations (cross-hatched tiles in FIG. 9) across different resource blocks as long as the subcarrier spacing between REs 206 used for each CSI-RS antenna port is uniform with the frequency spacing required. In certain designs, a different mapping across different resource blocks and/or subframes may be used to provide the same number of CSI-RS antenna port REs 206 for all antenna ports within each OFDM symbol for the purpose of power boosting the reference signal.

In certain designs, CSI-RS may be transmitted on multiple subframes within a given frame (as opposed to transmitting in a single subframe). In such designs, CSI-RS for different antenna ports of the same cell or CSI-RS across different cells may be transmitted in different sub-frames. In one aspect, the collision rate of CSI-RS across different cells may be probabilistically reduced. Furthermore, the eNB 110 may have more flexibility in the placement and the pattern of REs 206 allocated to CSI-RS. For example, when transmission is organized as frames comprising 10 subframes numbered 0 to 9, in certain designs, CSI-RS transmissions may occur only in subframe #0. In other designs, CSI-RS transmissions may be scheduled in more subframes—e.g., subframes 0 and 1.

However, using multiple sub-frames for CSI-RS transmission may require a trade-off due to possible impact on the performance of legacy UEs 120. For example, taking away REs 206 from many subframes may puncture the data region of legacy UEs 120 in multiple sub-frames, resulting in a system performance loss. Some designs may therefore limit the impact of puncturing legacy UE 120 data region to a predetermined number of CSI-RS carrying sub-frames so that eNB 110 may schedule data transmissions around these subframes by scheduling only LTE-A UEs 120 in these subframes or scheduling legacy UEs 120 with a lower rate in these subframes.

Furthermore, limiting CSI-RS transmission to a predetermined number of subframes may also enable better battery life management in UEs 120. For example, if CSI-RS from different antenna ports in a cell or from multiple cells are transmitted in subframes 1 and 6, then a UE 120 may have to wake up twice within a frame to receive and process CSI-RS transmissions. However, if all CSI-RS are transmitted in subframe 1, then a UE 120 may have to wake up only for one subframe, avoiding having to wake up frequently to measure CSI-RS from multiple cells or different antenna ports in different subframes.

Therefore, in certain designs, the transmission of CSI-RS may be restricted to a limited number of subframes, referred to as CSI-RS subframes. The number of CSI-RS subframes may be selected based on a desired CSI-RS collision rate across different cells. For example, restricting CSI-RS transmissions from all cells to the same subframe may result in a higher probability of collision, but may help improve battery performance of UEs 120, as discussed above. In certain designs, subframes that include PBCH, sync signals or paging within a radio frame from the CSI-RS subframe set, i.e. subframes {0, 4, 5, 9} in FDD mode, may be excluded from carrying CSI-RS, to avoid potential interference with these control signals.

In certain designs, when the number of CSI-RS subframes is greater than 1, the CSI-RS subframes used by neighboring eNBs 110 may be coordinated to be contiguous (e.g., subframe number 0 and 1) allowing a UE 120 to measure CSI-RS signals from different eNBs 110 in a single wake up cycle. Furthermore, CSI-RS transmissions from different eNBs 110 may be coordinated so that the number of contiguous subframes used may be limited to as small a number as possible. For example, if CSI-RS resources are available on one subframe in which another eNB is transmitting its CSI-RS, then a second eNB 110 may perform its CSI-RS transmissions on the same subframe instead of selecting another subframe for its CSI-RS transmissions.

In certain designs, CSI-RS transmissions from different antenna ports of the same cell may be orthogonally multiplexed. For example, with reference to FIG. 8, RE with index 11 in the region 804 and the neighboring RE with index 10 may both be used for CSI-RS transmission of two antenna ports (1 and 2). However, these two transmissions may be code division multiplexed to be orthogonal to each other.

As previously described with respect to FIG. 1, multiple eNBs 110 may be present in the wireless communication system 100. In certain designs, the multiple eNBs 110 may coordinate with each other the CSI-RS transmissions within each respective cell. The coordination may include two operations: "muting" and "hopping," as further described below.

The pattern of REs 206 allocated to CSI-RS transmissions in a cell may be hopped, or altered, to randomize occurrence of CSI-RS signals across different cells, to reduce a rate of collision. In situations of dominant interferer cell collision, hopping may advantageously avoid interference by the dominant eNB 110. For example, when there is no hopping, if CSI-RS of a cell collides with CSI-RS of a dominant interferer once, it may always collide, making it impossible for a UE 120 to obtain accurate CSI measurements from the CSI-RS. However, if the patterns are hopping it is quite likely that they do not collide on some occasions, which gives an opportunity to the UE 120 to estimate the CSI reliably using the CSI-RS of the weaker cells. In various designs, hopping patterns may be chosen as a function of the system time, the antenna port index, the physical cell ID or a combination of these parameters. For example, in some designs, each CSI-RS port may be assigned a frequency offset, a symbol index from the set of available symbols and a subframe index from the set of CSI-RS subframes. When 2 REs/RB per antenna port are assigned for CSI-RS transmission in each subframe, the CSI-RS port can be assigned to a different RE pair, as a random function of the above parameters.

In one design, the assignment of an antenna port to an RE pair index (e.g., 1 to 26, as shown in FIG. 5) may be carried out by randomly choosing from 1 to 26 in each subframe that a CSI-RS transmission may be present in. The subframe containing CSI-RS may be randomly chosen. The random hopping may be generated by a pseudo-random sequence generator that takes physical cell ID, system time and possibly antenna port index into account. In certain designs, the hopping function or the pseudo-random sequence may be chosen to preserve orthogonality across CSI-RS antenna ports of the same cell.

A hopping pattern may also be advantageously used to provide a higher frequency domain granularity for channel estimation. This may be especially true for low speed users or in cases where the duty cycle configured is low (i.e., CSI-RS are transmitted with large time gaps). For example, without a hopping pattern, to improve the frequency resolution may take a higher CSI-RS density in frequency to transmit CSI-RS covering a desired frequency range. However, using a hopping pattern, the eNB 110 may assign a pattern that ensures a wide sampling of the frequency domain (with different offset) for any antenna port. Hence, although the frequency resolution per look in time is low, the multiple looks in frequency obtained over time may improve the effective frequency resolution.

In certain designs, a hopping pattern may be defined not only to randomize (or orthogonalize) across the REs 206 within a subframe but across the REs 206 of all the CSI-RS subframes collectively. For example, if allocated RE locations for a particular CSI-RS port are represented as a function of three parameters: subframe number (SFN), time and frequency, then all these three parameters may be hopped within their set of possible values. This hopping, or randomization, may help randomize RE allocations when CSI-RS subframe set size is larger than one.

In certain examples, the assigned pattern of CSI-RS REs 206 may be hopped across subframes. In other words, for each cell, the subframe(s) containing CSI-RS transmissions may be hopped within the CSI-RS subframes set over time.

For example, consider CSI-RS subframe set {1,2} within a radio frame and assume that the CSI-RS periodicity is 10 ms. Then in each 10 ms period, the CSI-RS locations for a particular port and particular cell may be present in one of the subframes 1 or 2. In some designs, the allocated subframe (i.e., 1 or 2) may not change over time. For example, CSI-RS locations for port x, cellID y may always be present in subframe index 1. In other designs, the subframe assigned to CSI-RS for port x, cellID y may be hopped (or randomly chosen) every 10 ms, between all possible values of subframe index or number (1 or 2 in this example). The subframe number hopping may be a function of cell ID, antenna port and CSI-RS subframe set, or a system time.

The subframe hopping approach may help reduce collisions of intercell CSI-RS transmissions. For example, when all CSI-RS for all antenna ports of a cell in a duty cycle are present in one subframe chosen from the CSI-RS subframe set and the index of this subframe is hopped over time depending on the cell ID, among other parameters (e.g., number of CSI-RS antenna ports, number of CSI-RS subframes, and system time), then collision rate may be reduced because CSI-RS of different cells may be present in different subframes over time. In some designs, the impact on legacy UEs 100 may still be limited to a minimum number of subframes, as discussed previously, by constraining the total number of subframes used for CSI-RS transmissions. Furthermore, the computation complexity of feedback computation may also be reduced by limiting the total number of subframes of CSI-RS transmissions as above.

In some designs, two levels of hopping of CSI-RS pattern may be used. One level may correspond to the hopping of the frequency/time/code allocation to REs 206 within a subframe, and the other level may correspond to hopping of the subframe indices for which a CSI-RS transmission of a particular port and/or cell may be present. This multi-level hopping may help avoid collisions between CSI-RS transmissions of different antenna port indices across different cells.

In some designs, the hopping mode may be disabled or enabled in a semi-static or dynamic way. The UE 120 may be informed of the CSI-RS hopping mode by a higher layer signaling, through a broadcast or unicast channel, and/or within a layer 2 signaling.

In certain designs, the choice of enabling/disabling hopping mode and selecting locations that each cell will use for CSI-RS transmissions may be dependent on, for example, the transmission mode, the number of users and their channel quality and capabilities. For instance, if joint transmission in a multi-cell setup is employed in a cell, the network may coordinate (by communication among eNBs 110) the hopping mode and locations of a subset of cells. In one design, when eNBs 110 coordinate CSI-RS resources used, hopping may be disabled. It will be appreciated that each level of the two-level hopping, as described above, may be disabled independent of the other level. For example, it may be possible to consider disabling the hopping of the subframe index disjointly from the hopping of the CSI-RS locations within a subframe. For instance, in one design, subframe index hopping may be disabled so that a CSI-RS transmission may be performed only in subframe 1 in each radio frame but hopping of CSI-RS locations may be allowed within subframe 1 over a period of time.

In certain designs, one or more parameters regarding hopping schedule (e.g., time instances when hopping is turned on/off or a next CSI-RS pattern will be utilized, and so on) may be signaled from an eNB 110 to a UE 120. The hopping scheduling parameters may help the UE 120 identify the hopping schedule for the CSI-RS transmission.

In some designs, the available CSI-RS locations for each cell can be limited to a subset of all the available CSI-RS locations (e.g. depicted in FIG. 5). This subset may be different for different cells and may be changing over time. In addition, eNBs 110 may coordinate among each other at a higher layer (e.g., layer 3), the subset of REs within a subframe used by each eNB 110.

Certain designs, such as designs that use CSI-RS in coordinated multipoint transmission (CoMP) configurations, may perform "muting" of CSI-RS transmissions. For example, eNB 110 of a cell may not perform any transmissions at locations of RE 206 assigned to CSI-RS transmissions in a neighboring cell. It may be possible to improve the channel estimation performance of CSI-RS, or equivalently reduce the overhead for a given performance by performing this muting operation. Because of muting of other signals that may potentially interfere with CSI-RS transmissions of a given cell, estimation of channel state information from non-serving cells or weaker serving cells may be significantly improved. Information needed (e.g., RE locations) for traffic puncturing (muting) may be signaled between eNBs 110. Additionally, UEs 120 within a cell may be informed of the data muting by the eNB 110 to make the UEs 120 aware that data is not being transmitted to those UEs 120 and to avoid potential interference of data transmissions with another cell's CSI-RS transmissions.

Figures 10, 11:
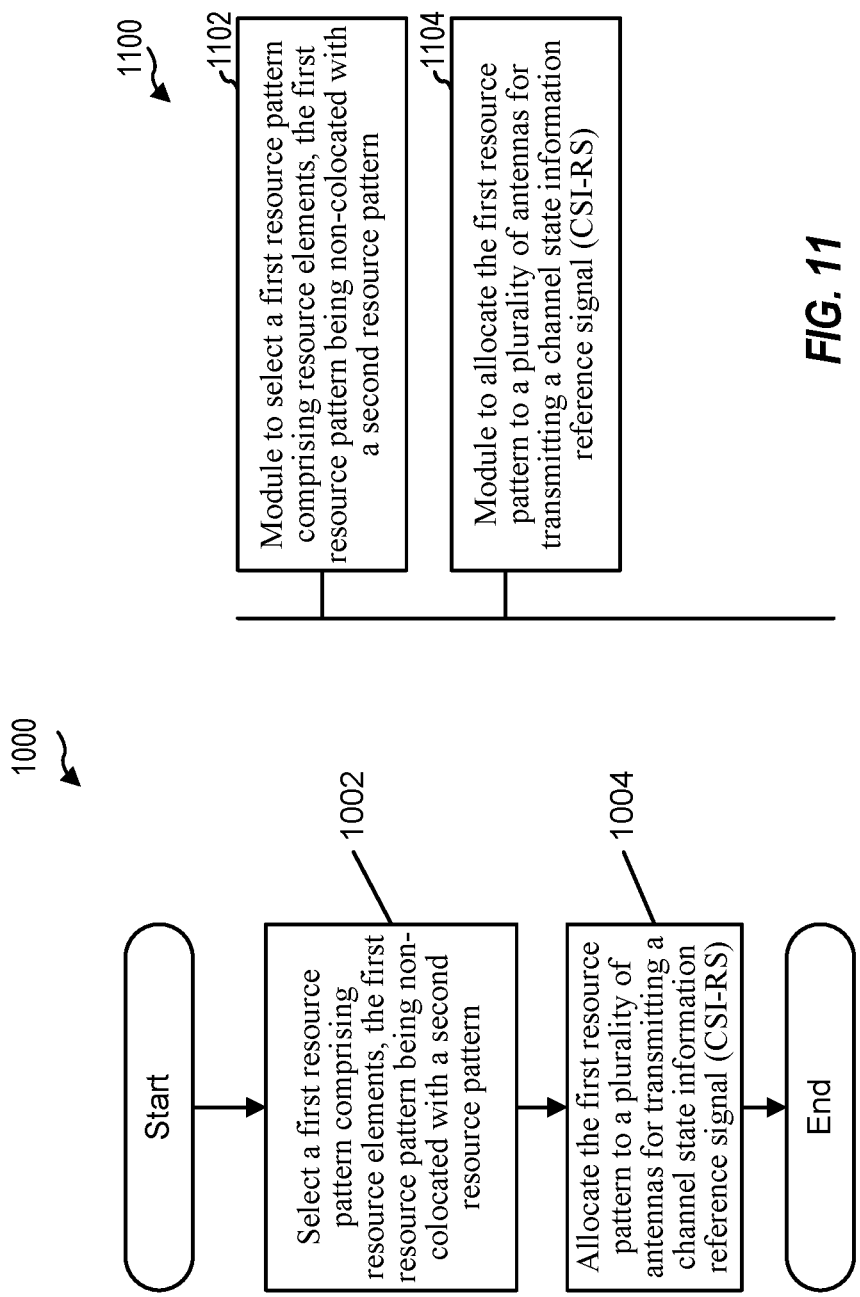
FIG. 10 illustrates a process for wireless communication.
FIG. 11 illustrates an apparatus for wireless communication.

FIG. 10 illustrates a process 1000 for wireless communication. At operation 1002, a first resource pattern comprising resource elements is selected. The first resource pattern may comprise, for example, possible RE locations as described in FIGS. 3 to 7. In certain designs, the resource elements may be uniformly spaced. The first resource pattern is non-colocated with a second resource pattern. The second resource pattern may, for example, comprise RE locations allocated to other reference signals such as CRS and DM-RS (or UE-RS). At operation 1004, the first resource pattern is allocated to a plurality of antennas for transmitting a channel state information reference signal (CSI-RS). The allocation may be performed, for example, as described with respect to FIGS. 8 and 9. The process 1000 may further include one or more of the RE allocation techniques discussed in this disclosure.

FIG. 11 illustrates an apparatus 1100 for wireless communication. The apparatus 1100 include a module 1102 to selecting a first resource pattern comprising resource elements, the first resource pattern being non-colocated with a second resource pattern and a module 1104 to allocate the first resource pattern to a plurality of antennas for transmitting a channel state information reference signal (CSI-RS). In certain designs, the first resource pattern may comprise uniformly spaced resource elements. The first resource pattern may comprise, for example, possible RE locations as described in FIGS. 3 to 7. The second resource pattern may, for example, comprise RE locations allocated to other reference signals such as CRS and DM-RS (or UE-RS). The allocation may be performed, for example, as described with respect to FIGS. 8 and 9. The apparatus 1100 may further include modules for implementing one or more of the designs discussed in this disclosure.

Figures 12, 13:
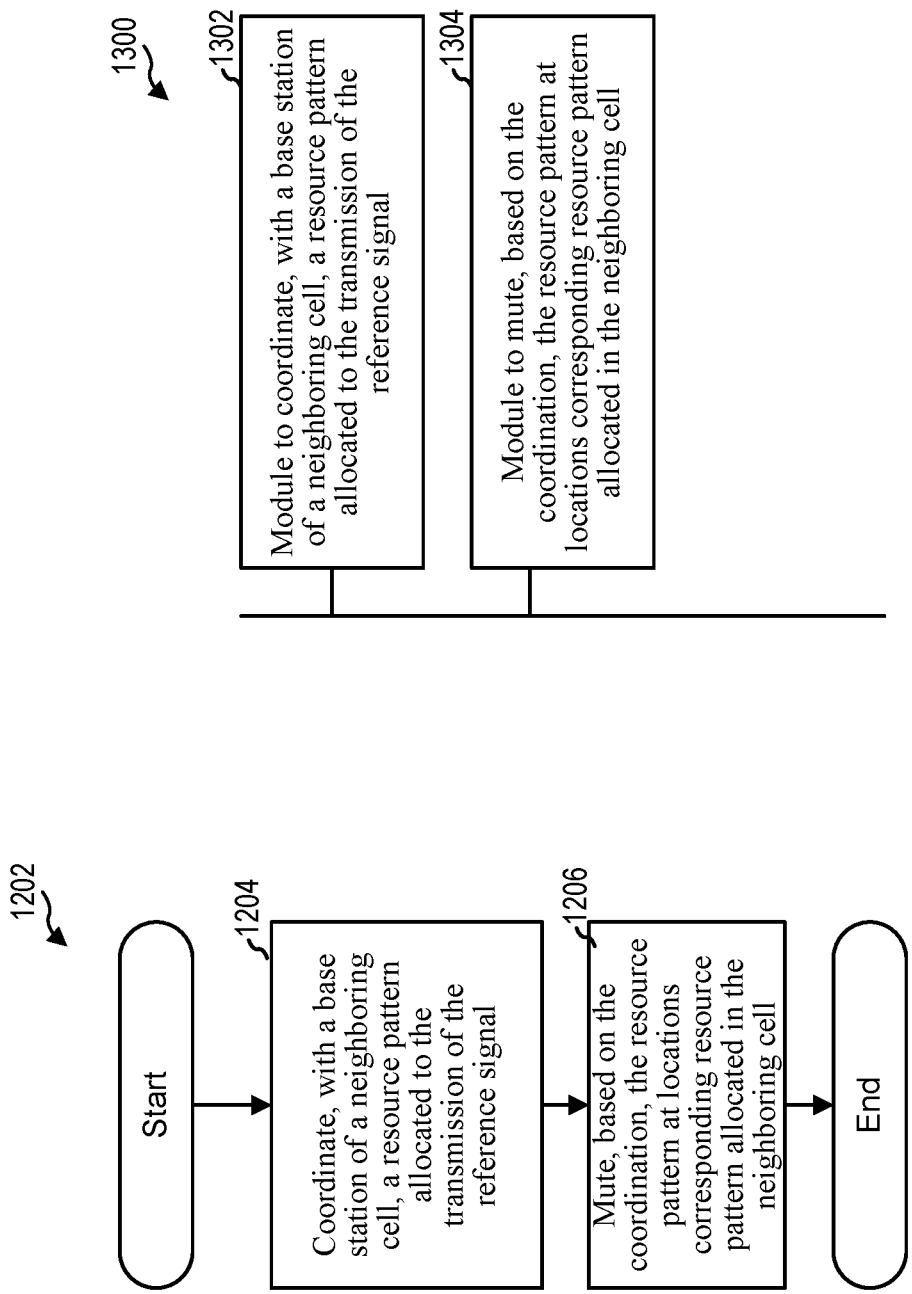
FIG. 12 illustrates another process for wireless communication.
FIG. 13 illustrates a base station apparatus for wireless communication.

FIG. 12 illustrates a process 1202 of wireless communication of allocating resources to a transmission of a reference signal, implemented at an eNB. At operation 1204, a resource pattern allocated to the transmission of the reference signal is coordinated with a base station of a neighboring cell. The coordination may include, for example, the muting or the hopping operation described above. At operation 1206, the resource pattern at locations corresponding resource pattern allocated in the neighboring cell is muted based on the coordination. The process 1200 may further include one or more of the techniques discussed in this disclosure.

FIG. 13 illustrates a base station apparatus 1300 for wireless communication. The apparatus 1300 includes a module 1302 for coordinating, with a base station of a neighboring cell, a resource pattern allocated to the transmission of the reference signal and a module 1304 for muting, based on the coordination, the resource pattern at locations corresponding resource pattern allocated in the neighboring cell. The coordination may include, for example, the muting or the hopping operation described above. The apparatus 1300 may further include modules for implementing one or more of the designs discussed in this disclosure.

Figures 14, 15:
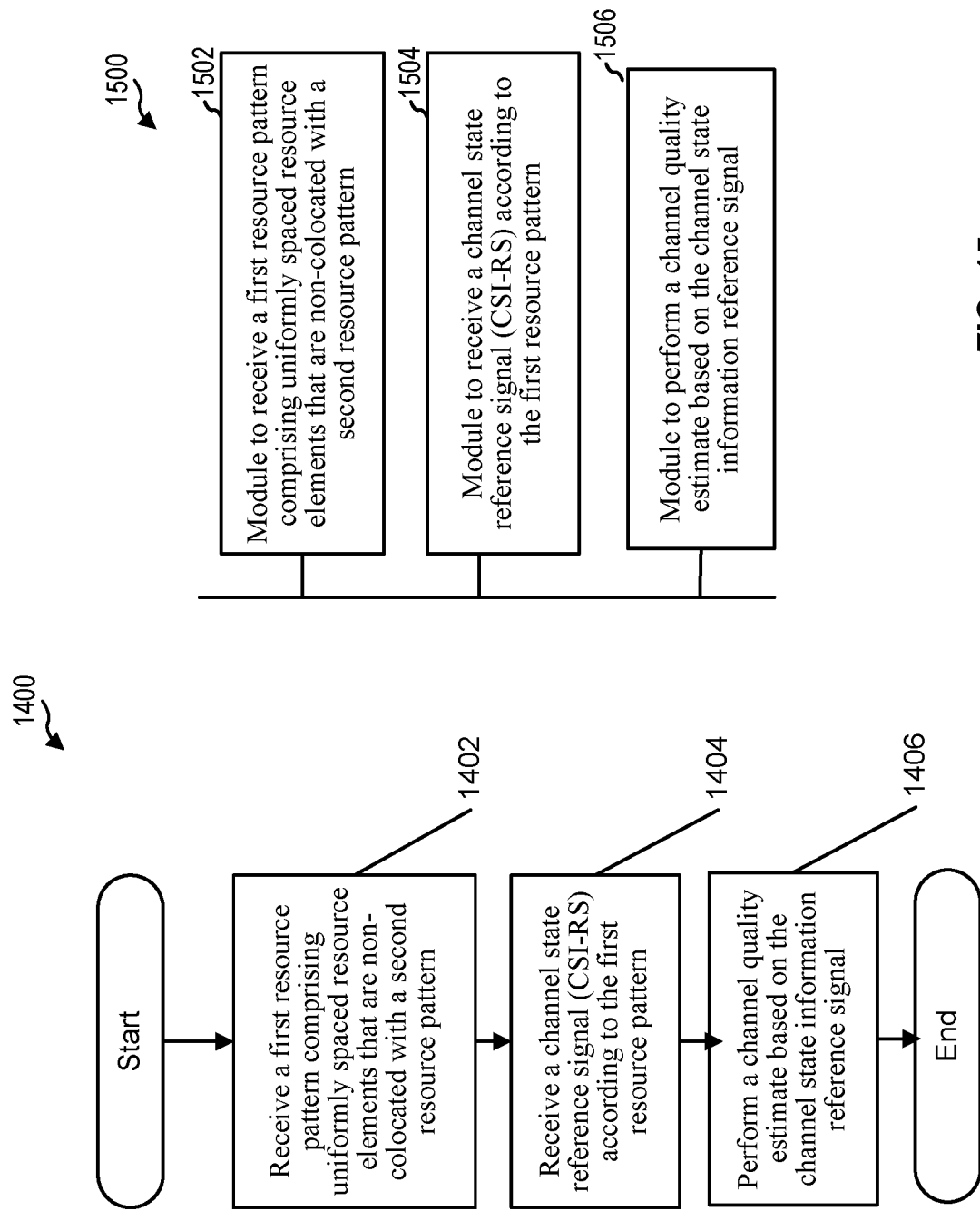
FIG. 14 illustrates yet another process for wireless communication.
FIG. 15 illustrates a user equipment apparatus for wireless communication.

FIG. 14 illustrates a process 1400 of wireless communication, implemented at a UE. At operation 1402, a first resource pattern comprising resource elements that are non-colocated with a second resource pattern is received. The first resource pattern may, for example, include uniformly spaced resource elements. At operation 1404, a channel state information reference signal (CSI-RS) according to the first resource pattern is received. At operation 1406, a channel quality estimate based on the channel state information reference signal is performed. The process 1400 may further include one or more of the techniques discussed in this disclosure.

FIG. 15 illustrates a user equipment apparatus 1500 for wireless communication. The apparatus 1500 comprises module 1502 for receiving a first resource pattern comprising resource element groups that are non-colocated with a second resource pattern, module 1504 for receiving a channel state information reference signal (CSI-RS) according to the first resource pattern and module 1506 for performing a channel quality estimate based on the channel state information reference signal. The apparatus 1300 may further include modules for implementing one or more of the designs discussed in this disclosure.

Figure 16:
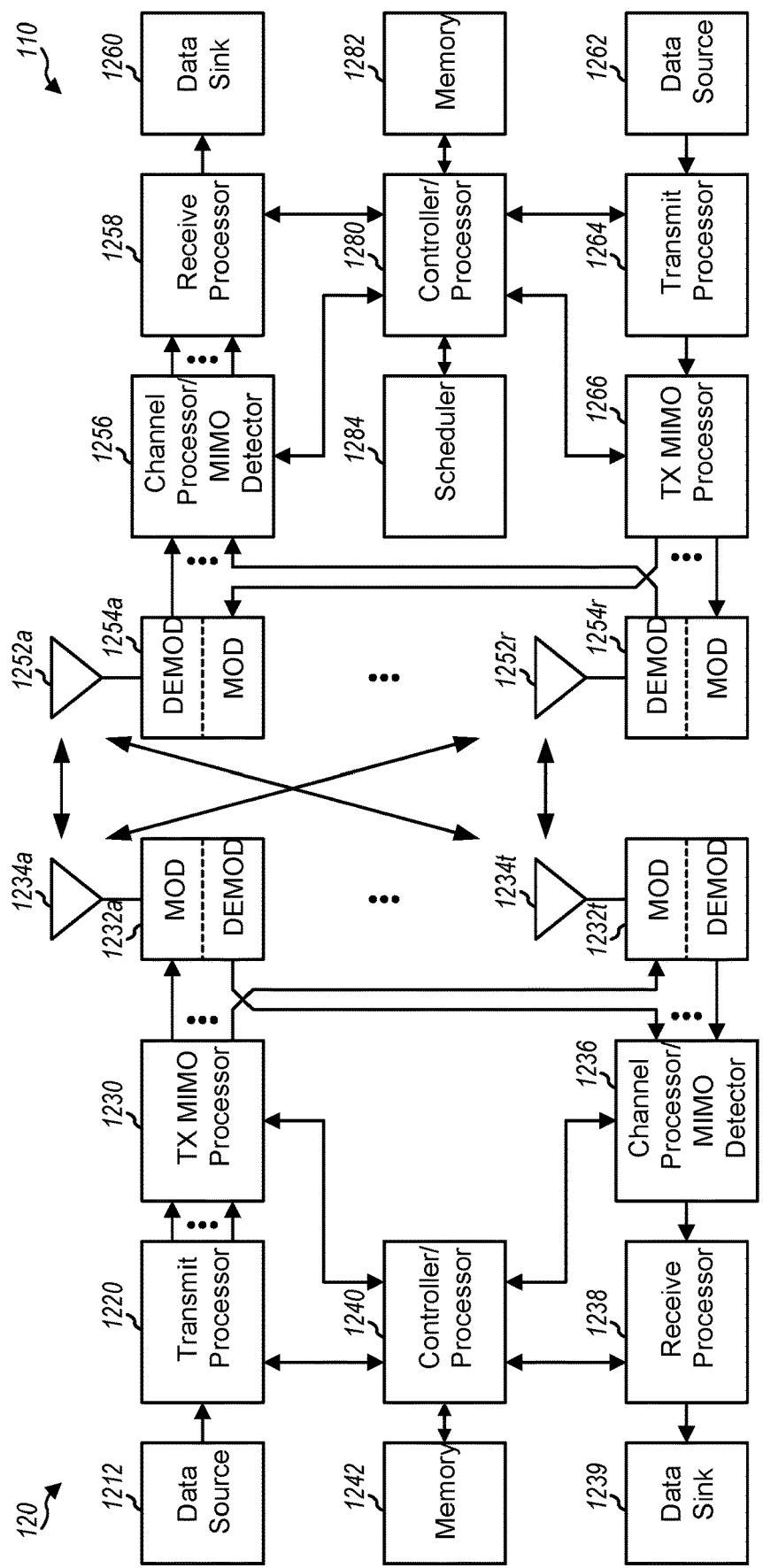
FIG. 16 illustrates a transmission apparatus for wireless communication.

FIG. 16 illustrates a block diagram of a design of an exemplary base station/eNB 110 and a UE 120, which may be one of the eNBs and one of the UEs in FIG. 1, where the various processes disclosed above may be implemented, as appropriate. The UE 120 may be equipped with T antennas 1234a through 1234t, and the base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 1400 in FIG. 14 and/or other processes for the techniques described herein. Processor 1256, processor 1280, and/or other processors and modules at base station 110 may perform or direct process 1202 in FIG. 12 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

It will be appreciated that several properties of CSI-RS transmissions are disclosed herein. In certain designs, CSI-RS pattern (i.e., the pattern or REs within a subframe, assigned to the transmission of CSI-RS signal) may cell-specific. The pattern of CSI-RS transmissions may depends on the number of antenna ports, a physical cell ID of the particular cell and so on. In certain designs, the transmission overhead associated with CSI-RS may be controlled by selecting an appropriate duty cycle of transmission. In certain designs, the transmission overhead associated with CSI-RS may be controlled by limiting the number of REs assigned per RB to CSI-RS transmissions.

In will further be appreciated that several techniques of limiting impact of CSI-RS transmissions on legacy equipment are disclosed. For example, in certain designs, CSI-RS transmissions across different cells may be limited to a small number of subframes, thereby reducing impact on wake up time of a UE 120 and puncturing of data traffic to legacy UEs 120. In certain designs, CSI-RS is not transmitted on a subframe of a radio frame which transmits a paging, or a PBCH or a sync signal.

It will further be appreciated that the disclosed designs enable efficient implementation of CSI-RS framework. For example, in some designs, the number of CSI-RS ports is statically configured. In some designs, the duty cycle of the CSI-RS may be semi-statically configured from a limited set of values, e.g. {2, 5, 10} ms.

It will further be appreciated that techniques are disclosed to enable orthogonal transmission of CSI-RS. In some designs, CSI-RS of an antenna port of a cell may be uniformly spaced in frequency in one OFDM symbol with a frequency spacing of a fixed number (e.g., 6) of subcarriers.

In certain designs, CSI-RS pattern of different antenna ports of different cells may hop in time. The hopping may be a function of the physical cell ID, antenna port index and the system time.

In certain designs, data/control signal transmissions may be muted in locations used by CSI-RS transmissions of neighboring cells. In some designs, the muting may be performed based on coordination among multiple eNBs 110.

It will be appreciated that the CSI-RS designs disclosed herein may be used with any transmission mode, such as a single-cell single and MU-MIMO and coordinated multi-cell transmission.

It will be appreciated that CSI-RS designs as discussed herein may be embodied to include one or more of the following aspects, among other aspects disclosed herein:

(1) CSI-RS of a cell may avoid CRS REs of that cell.

(2) CSI-RS may entirely avoid CRS symbols to avoid collision with CRS of neighboring cell(s).

(3) CSI-RS may avoid UE-specific RS (UE-RS) REs. It should be noted that the UE specific RS REs refers to any REs that could be used for UE-RS and may not always be used for UE-RS.

(4) CSI-RS may avoid UE-RS of one LTE release but not of another. For example, certain designs may avoid Rel 9/10 UE-RS but not Rel 8 UE-RS.

(5) CSI-RS patterns may be chosen such that they avoid UE-RS REs of any cell.

(6) CSI-RS pattern for a cell may be chosen such that they avoid UE-RS REs only of that cell. Because Rel-8 UE-RS pattern is different for different cell IDs, it may affect the number of available CSI-RS patterns and the signaling thereof.

(7) CSI-RS pattern may be chosen to be a function of one or more of cell ID, number of CSI-RS antenna ports and a type of subframe in which CSI-RS is transmitted.

(8) CSI-RS pattern may be chosen to avoid symbols and/or subframes containing Sync Signals, PBCH or paging.

(9) CSI-RS of different antenna ports of same cells may be orthogonally multiplexed.

(10) CSI-RS of different cells may be orthogonally multiplexed with respect to each other.

(11) CSI-RS of neighboring cells may be muted to avoid collision/interference.

(12) Muting may be signaled to UEs to avoid transmissions in muted transmission resources.

(13) CSI-RS patterns may be hopped across subframes.

(14) Hopping pattern may be a function of cell ID, subframe index, and/or other system parameters.

(15) Hopping may be selectively used and enabling or disabling of hopping may be signaled to user equipment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wireless communication, comprising:
   selecting a cell-specific channel station information reference signal (CSI-RS) resource pattern comprising a pattern of resource elements assigned to the transmission of the CSI-RS signal within a CSI-RS subframe of a plurality of CSI-RS subframes, the cell-specific CSI-RS resource pattern being non-colocated with another resource pattern assigned to a reference signal other than the CSI-RS, the CSI-RS subframe not including a synchronization signal, a paging signal and/or a broadcast signal, and an index of the CSI-RS resource pattern being hopped for each CSI-RS subframe of the plurality of CSI-RS subframes based on a cell ID and any combination of a number of CSI-RS antenna ports, a number of CSI-RS subframes within a frame, and a system time;
   allocating the cell-specific CSI-RS resource pattern to a plurality of antennas for transmitting the CSI-RS by grouping the CSI-RS resource pattern in a plurality of groups of resource elements and assigning each group of resource elements to a different antenna of the plurality of antennas; and
   transmitting, using the plurality of antennas, the CSI-RS according to the cell-specific CSI-RS resource pattern.

2. The method of claim 1, wherein the reference signal other than the CSI-RS comprises one of a user equipment reference signal, a common reference signal and a control signal.

3. The method of claim 1, wherein transmitting the cell-specific CSI-RS resource pattern comprises transmitting the CSI-RS in a predetermined number of the CSI-RS subframes within the frame.

4. The method of claim 1, wherein the other resource pattern comprises a transmission resource pattern allocated in another cell.

5. The method of claim 1, wherein the allocating comprises allocating a number of uniformly spaced resource elements to each antenna of the plurality of antennas.

6. The method of claim 1, wherein the other resource pattern comprises transmission resources allocated to a common reference signal in another cell.

7. The method of claim 1, wherein selecting the cell-specific CSI-RS resource pattern comprises selecting the cell-specific CSI-RS resource pattern based on one or more of a cell identification, a number of the plurality of antennas and a type of the CSI-RS subframe.

8. The method of claim 1, further comprising code division multiplexing each group of resource elements assigned to the different antenna of the plurality of antennas to be orthogonal to each other.

9. A method for wireless communication, comprising:
   receiving, by a user equipment (UE), a channel state information reference signal (CSI-RS) in a CSI-RS subframe at a first time according to a cell-specific CSI-RS resource pattern comprising a pattern of resource elements assigned to the transmission of the CSI-RS signal within the CSI-RS subframe, the cell-specific CSI-RS resource pattern being non-colocated with another resource pattern assigned to a reference signal other than the CSI-RS, the CSI-RS subframe not including a synchronization signal, a paging signal, and/or a broadcast signal;
   performing, by the UE, a channel quality estimate based on the CSI-RS;
   reporting, by the UE, the channel quality estimate to a base station; and
   receiving the CSI-RS at a second time, wherein an index of the CSI-RS subframe is hopped between the first time and the second time based on a cell ID and any combination of a number of CSI-RS antenna ports, a number of CSI-RS subframes within a frame, and a system time.

10. The method of claim 9, wherein the reference signal other than the CSI-RS comprises one of a user equipment reference signal, a common reference signal and a control signal.

11. The method of claim 10, wherein the reference signal other than the CSI-RS is the common reference signal (CRS)

and wherein the received CSI-RS comprises uniformly spaced resource elements corresponding to spacing similar to the CRS, the method further comprising demodulating the CSI-RS using a demodulation structure of the CRS.

12. The method of claim 9, wherein receiving the CSI-RS comprises receiving the CSI-RS resource pattern in a plurality of groups of resource elements, wherein each group of resource elements is code division multiplexed to be orthogonal to each other.

13. An apparatus comprising:
a processor;
a memory in communication with the processor, wherein the processor and the memory are configured to:
select a cell-specific channel state information reference signal (CSI-RS) resource pattern comprising a pattern of resource elements assigned to the transmission of the CSI-RS signal within a CSI-RS subframe of a plurality of CSI-RS subframes, the cell-specific CSI-RS resource pattern being non-colocated with another resource pattern assigned to a reference signal other than the CSI-RS, the CSI-RS subframe not including a synchronization signal, a paging signal and/or a broadcast signal, and an index of the CSI-RS resource pattern being hopped for each CSI-RS subframe of the plurality of CSI-RS subframes based on a cell ID and any combination of a number of CSI-RS antenna ports, a number of CSI-RS subframes within a frame, and a system time;
allocate the cell-specific CSI-RS resource pattern to a plurality of antennas for transmitting the CSI-RS by grouping the CSI-RS resource pattern in a plurality of groups of resource elements and assigning each group of resource elements to a different antenna of the plurality of antennas; and
transmit, using the plurality of antennas, the CSI-RS according to the cell-specific CSI-RS resource pattern.

14. The apparatus of claim 13, wherein the processor and the memory configured to transmit the cell-specific CSI-RS resource pattern comprises the processor and the memory configured to transmit the CSI-RS in a predetermined number of the CSI-RS subframes within the frame.

15. The apparatus of claim 13, wherein the processor and the memory configured to select the cell-specific CSI-RS resource pattern comprises the processor and the memory configured to select the cell-specific CSI-RS resource pattern based on one or more of a cell identification, a number of the plurality of antennas and a type of the CSI-RS subframe.

16. The apparatus of claim 13, the processor and the memory further configured to code division multiplex each group of resource elements assigned to the different antenna of the plurality of antennas to be orthogonal to each other.

17. A user equipment (UE) comprising:
a processor;
an antenna controlled by the processor; and
a memory in communication with the processor, wherein the processor and the memory are configured to:
receive, via the antenna, a channel state information reference signal (CSI-RS) in a CSI-RS subframe at a first time according to a cell-specific CSI-RS resource pattern comprising a pattern of resource elements assigned to the transmission of the CSI-RS signal within the CSI-RS subframe, the cell-specific CSI-RS resource pattern being non-colocated with another resource pattern assigned to a reference signal other than the CSI-RS, the CSI-RS subframe not including a synchronization signal, a paging signal, and/or a broadcast signal;
perform a channel quality estimate based on the CSI-RS;
report, via the antenna, the channel quality estimate to a base station; and
receive, via the antenna, the CSI-RS at a second time, wherein an index of the CSI-RS subframe is hopped between the first time and the second time based on a cell ID and any combination of a number of CSI-RS antenna ports, a number of CSI-RS subframes within a frame, and a system time.

18. The UE of claim 17, the processor and the memory further configured to demodulate the CSI-RS using a demodulation structure used for the reference signal other than the CSI-RS.

19. The UE of claim 18, wherein the reference signal other than the CSI-RS is a common reference signal (CRS) and wherein the received CSI-RS comprises uniformly spaced resource elements corresponding to spacing similar to the CRS.

20. The UE of claim 17, wherein the processor and the memory configured to receive the CSI-RS comprises the processor and the memory configured to receive the CSI-RS resource pattern in a plurality of groups of resource elements, wherein each group of resource elements is code division multiplexed to be orthogonal to each other.

* * * * *